(12) United States Patent
Luo et al.

(10) Patent No.: US 8,670,396 B2
(45) Date of Patent: Mar. 11, 2014

(54) UPLINK CONTROL CHANNEL RESOURCE ALLOCATION FOR TRANSMIT DIVERSITY

(75) Inventors: Xiliang Luo, Northridge, CA (US); Wanshi Chen, San Diego, CA (US); Jelena M. Damnjanovic, Del Mar, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 12/890,452

(22) Filed: Sep. 24, 2010

(65) Prior Publication Data

US 2011/0228731 A1    Sep. 22, 2011

Related U.S. Application Data

(60) Provisional application No. 61/246,841, filed on Sep. 29, 2009.

(51) Int. Cl.
*H04W 4/00* (2009.01)

(52) U.S. Cl.
USPC .......................................................... 370/329

(58) Field of Classification Search
None
See application file for complete search history.

(56) References Cited

U.S. PATENT DOCUMENTS

| | | | | |
|---|---|---|---|---|
| 2007/0097928 A1* | 5/2007 | Anderson | ...................... | 370/335 |
| 2008/0225791 A1* | 9/2008 | Pi et al. | ......................... | 370/330 |
| 2009/0109917 A1* | 4/2009 | Pajukoski et al. | ............. | 370/329 |
| 2010/0002800 A1* | 1/2010 | Kim et al. | ..................... | 375/295 |
| 2010/0291966 A1 | 11/2010 | Hu et al. | | |
| 2011/0083066 A1* | 4/2011 | Chung et al. | .................. | 714/807 |

FOREIGN PATENT DOCUMENTS

| | | |
|---|---|---|
| WO | 2009022704 A1 | 2/2009 |
| WO | 2010132294 | 11/2010 |

OTHER PUBLICATIONS

Huawei: "Further discussion on multiple antenna transmission for PUCCH", 3GPP Draft; R1-093049 Further Discussion on Multiple Antenna Transmission for PUCCH, 3rd Generation Partnership Project (3GPP), Mobile Competence Centre ; 650, Route Des Lucioles ; F-06921 Sophia-Antipolis Cedex ; France, No. Shenzhen, China; 20090818, Aug. 18, 2009, XP050351441, [retrieved on Aug. 18, 2009] paragraphs [0001], [0002].

International Search Report and Written Opinion—PCT/US2010/050768, International Search Authority—European Patent Office—Dec. 29, 2010 (093528).

Panasonic et al: "PDCCH validation for, semi-persistent scheduling", , 3GPP Draft; R1-084598, 3rd Generation Partnership Project (3GPP), Mobile Competence Centre ; 650, Route Des Lucioles ; F-06921 Sophia-Antipolis Cedex ; France, No. Prague, Czech Republic; 20081118, Nov. 18, 2008, XP050317834, [retrieved on Nov. 18, 2008] paragraph [10.1].

(Continued)

*Primary Examiner* — Yong Zhou
(74) *Attorney, Agent, or Firm* — Liem T. Do

(57) ABSTRACT

Systems and methods for resource allocation for an uplink control channel for a user equipment (UE) using multiple transmit antennas in a wireless communication network are disclosed. A plurality of orthogonal resources for use by the UE on the uplink control channel is selected. Control information is transmitted from the UE on the uplink control channel on the plurality of orthogonal resources with transmit diversity.

47 Claims, 30 Drawing Sheets

(56) References Cited

OTHER PUBLICATIONS

Qualcomm Europe: "PUCCH Transmit Diversity", 3GPP Draft; R1-092711 PUCCH TX Diversity, 3rd Generation Partnership Project (3GPP), Mobile Competence Centre ; 650, Route Des Lucioles ; F-06921 Sophia-Antipolis Cedex ; France, No. Los Angeles, USA; 20090624, Jun. 24, 2009, XP050351182, [retrieved on Jun. 24, 2009] paragraph [02.2].

Samsung: "UL Transmit diversity for PUCCH in LTE-A", 3GPP Draft; UL Transmit Diversity for PUCCH in LTE-A, 3rd Generation Partnership Project (3GPP), Mobile Competence Centre ; 650, Route Des Lucioles ; F-06921 Sophia-Antipolis Cedex ; France, No. San Francisco, USA; 20090428, Apr. 28, 2009, XP050339707, [retrieved on Apr. 28, 2009] the whole document.

ZTE: Uplink Control Channel Design for LTE-Advanced 3GPP Draft; R1-093209 Uplink Control Channel Design for LTE-A, 3rd Generation Partnership Project (3GPP), Mobile, Competence Centre ; 650, Route Des Lucioles ; F-06921 Sophia-Antipolis Cedex ; France, No. Shenzhen, China; 20090819, Aug. 19, 2009, XP050351562, [retrieved on Aug. 19, 2009] the whole document.

\* cited by examiner

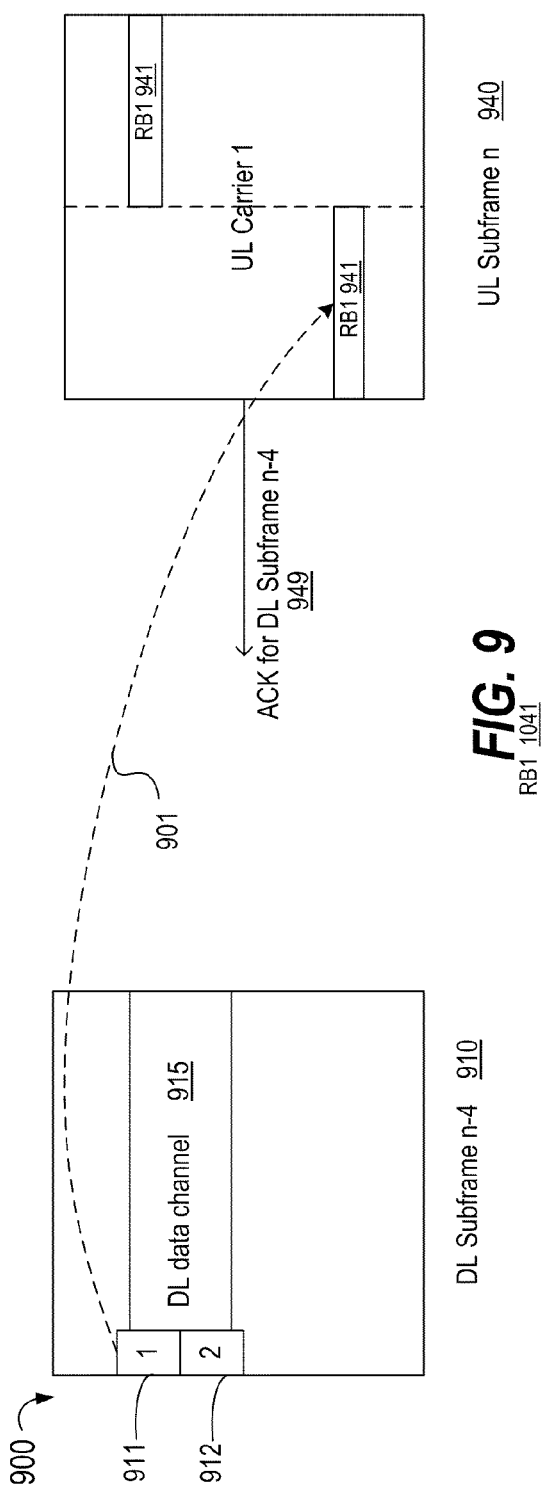
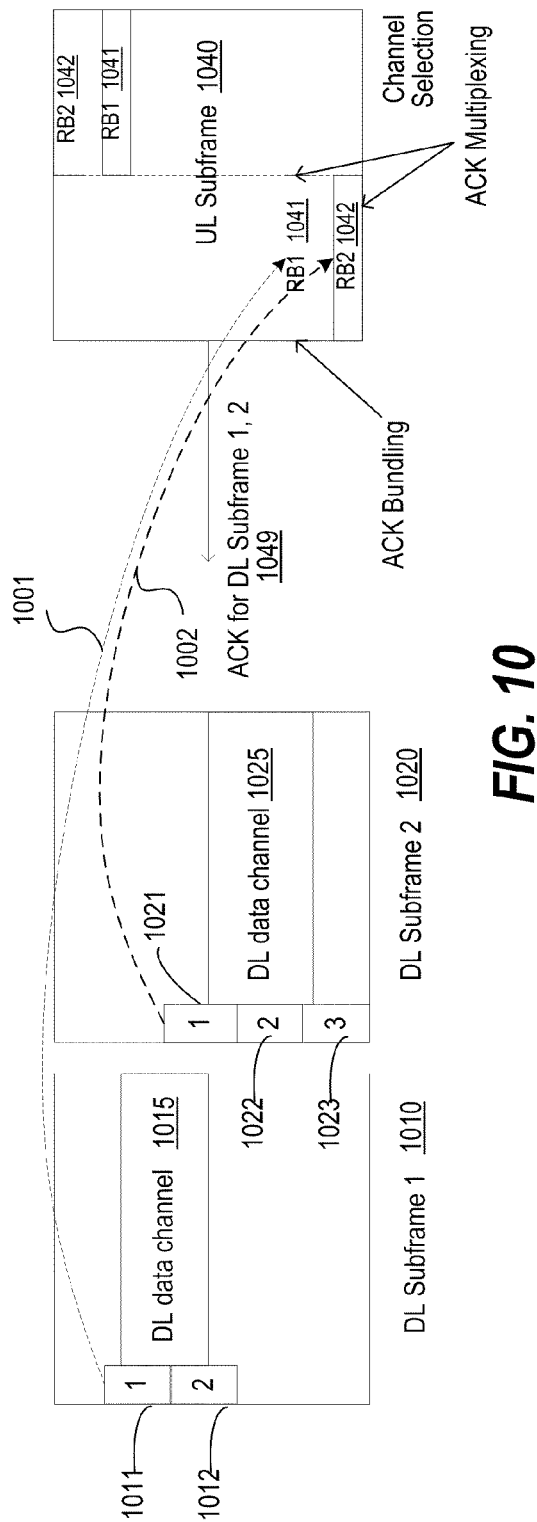

UPLINK CONTROL CHANNEL RESOURCE ALLOCATION FOR TRANSMIT DIVERSITY

CROSS-REFERENCE TO RELATED APPLICATION

The present application claims the benefit of U.S. Provisional Patent Application Ser. No. 61/246,841, entitled "UPLINK CONTROL CHANNEL RESOURCE ALLOCATION FOR TRANSMIT DIVERSITY," filed on Sep. 29, 2009, which is hereby incorporated by reference in its entirety.

BACKGROUND

1. Field of the Invention

The present disclosure relates generally to communication, and more specifically for uplink control channel resource allocation for transmit diversity across multiple transmit antennas in a wireless communication network.

2. Relevant Background

The 3rd Generation Partnership Project (3GPP) Long Term Evolution (LTE) represents a major advance in cellular technology and is the next step forward in cellular 3G services as a natural evolution of Global system for mobile communications (GSM) and Universal Mobile Telecommunications System (UMTS). LTE provides for an uplink speed of up to 50 megabits per second (Mbps) and a downlink speed of up to 100 Mbps and brings many technical benefits to cellular networks. LTE is designed to meet carrier needs for high-speed data and media transport as well as high-capacity voice support well into the next decade. Bandwidth is scalable from 1.25 MHz to 20 MHz. This suits the needs of different network operators that have different bandwidth allocations, and also allows operators to provide different services based on spectrum. LTE is also expected to improve spectral efficiency in 3G networks, allowing carriers to provide more data and voice services over a given bandwidth. LTE encompasses high-speed data, multimedia unicast and multimedia broadcast services.

The LTE physical layer (PHY) is a highly efficient means of conveying both data and control information between an enhanced base station (eNodeB) and mobile user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier-Frequency Division Multiple Access (SC-FDMA) on the uplink (UL). OFDMA allows data to be directed to or from multiple users on a subcarrier-by-subcarrier basis for a specified number of symbol periods.

Recently, LTE Advanced is an evolving mobile communication standard for providing 4G services. Being defined as 3G technology, LTE does not meet the requirements for 4G also called IMT Advanced as defined by the International Telecommunication Union such as peak data rates up to 1 Gbit/s. Besides the peak data rate, LTE Advanced also targets faster switching between power states and improved performance at the cell edge.

Physical Uplink Control Channel (PUCCH) transmission in current LTE (Rel-8) uses one resource. To achieve transmit diversity, multiple resources are needed for the PUCCH.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with allocating multiple resources for use by a user equipment (UE) to send control information on an uplink control channel with diversity transmission of the control information.

In an aspect, a method is provided for resource allocation for an uplink control channel for a user equipment (UE) using multiple transmit antennas in a wireless communication network, the method comprising determining a plurality of orthogonal resources that the UE will use on the uplink control channel, optimizing the scheduling of resources for other user equipments based on the determined plurality of orthogonal resources, and receiving control information from the UE on the uplink control channel on the plurality of orthogonal resources with transmit diversity.

In another aspect, a wireless communication apparatus is provided for use in a wireless communication network, the apparatus supporting resource allocation for an uplink control channel for a user equipment (UE) using multiple transmit antennas, the apparatus comprising means for determining a plurality of orthogonal resources that the UE will use on the uplink control channel, means for optimizing the scheduling of resources for other user equipments based on the determined plurality of orthogonal resources, and means for receiving control information from the UE on the uplink control channel on the plurality of orthogonal resources with transmit diversity.

In a further aspect, a computer program product is provided comprising a computer-readable storage medium comprising instructions that cause a computer to: determine a plurality of orthogonal resources that a user equipment (UE) with multiple transmit antennas will use on an uplink control channel, optimize the scheduling of resources for other user equipments based on the determined plurality of orthogonal resources, and receive control information from the UE on the uplink control channel on the plurality of orthogonal resources with transmit diversity.

In another aspect, a wireless communication apparatus is provided for use in a wireless communication network, the apparatus supporting resource allocation for an uplink control channel for a user equipment (UE) using multiple transmit antennas, the apparatus comprising a processor configured for determining a plurality of orthogonal resources that the UE will use on the uplink control channel, optimizing the scheduling of resources for other user equipments based on the determined plurality of orthogonal resources, and receiving control information from the UE on the uplink control channel on the plurality of orthogonal resources with transmit diversity.

In another aspect, a method is provided for resource allocation for an uplink control channel for a user equipment (UE) using multiple transmit antennas in a wireless communication network, the method comprising selecting a plurality of orthogonal resources for use by the UE on the uplink control channel, and transmitting control information on the uplink control channel on the plurality of orthogonal resources with transmit diversity.

In another aspect, a wireless communication apparatus is provided for use in a wireless communication network, the apparatus supporting resource allocation for an uplink control channel using multiple transmit antennas, the apparatus comprising means for selecting a plurality of orthogonal resources for use on the uplink control channel, and means for transmitting control information on the uplink control channel on the plurality of orthogonal resources with transmit diversity.

In a further aspect, a computer program product comprising a computer-readable storage medium including instructions that cause a computer to: select a plurality of orthogonal resources for use by a user equipment (UE) with multiple transmit antennas on an uplink control channel, and transmit control information from the UE on the uplink control channel on the plurality of orthogonal resources with transmit diversity.

In another aspect, a wireless communication apparatus is provided for use in a wireless communication network, the apparatus supporting resource allocation for an uplink control channel using multiple transmit antennas, the apparatus comprising a processor configured for selecting a plurality of orthogonal resources for use on the uplink control channel, and transmitting control information on the uplink control channel on the plurality of orthogonal resources with transmit diversity.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 9 is a diagram illustrating ACK/NACK feedback by an Rel-8 LTE UE in Frequency Division Duplex (FDD) operation.

FIG. 10 is a diagram illustrating ACK/NACK feedback by an Rel-8 LTE UE in Time Division Duplex (TDD) operation.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
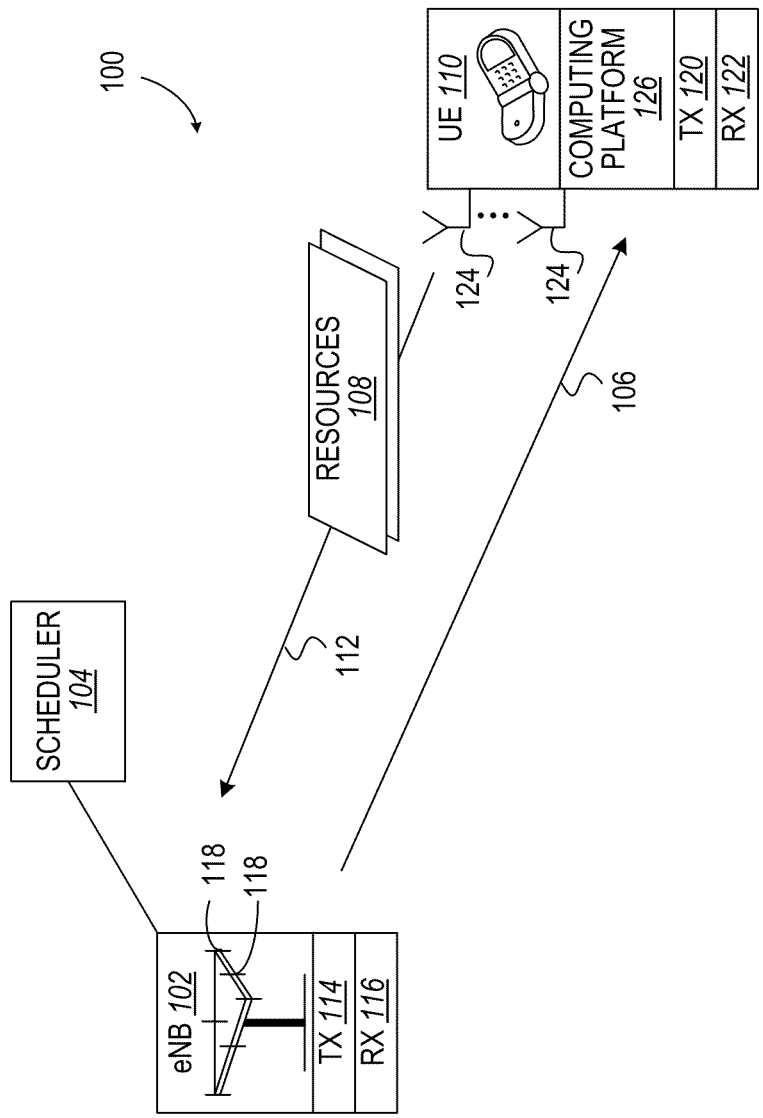
FIG. 1 illustrates a Multiple Input Multiple Output (MIMO) communication system that benefits from uplink transmission diversity.

In FIG. 1, communication system 100 deploys a node, depicted as an evolved Base Node (eNB) 102 that responds to a scheduler 104 to transmit via a downlink 106 an assignment for uplink (UL) orthogonal resources 108 that User Equipment (UE) 110 can use on an uplink 112 for transmit diversity. To that end, a transmitter (Tx) 114 and a receiver (Rx) 116 for the eNB 102 can use a plurality of antennas 118 for Multiple Input Multiple Output (MIMO) operation. Similarly, a transmitter (Tx) 120 and a receiver (Rx) 122 for the UE 110 can use a plurality of antennas 124 for MIMO operation. In an exemplary aspect, a computing platform 126 of the UE 110 utilizes the assignment for PUCCH resource allocation in 3GPP LTE-A for transmit diversity.

Figure 2:
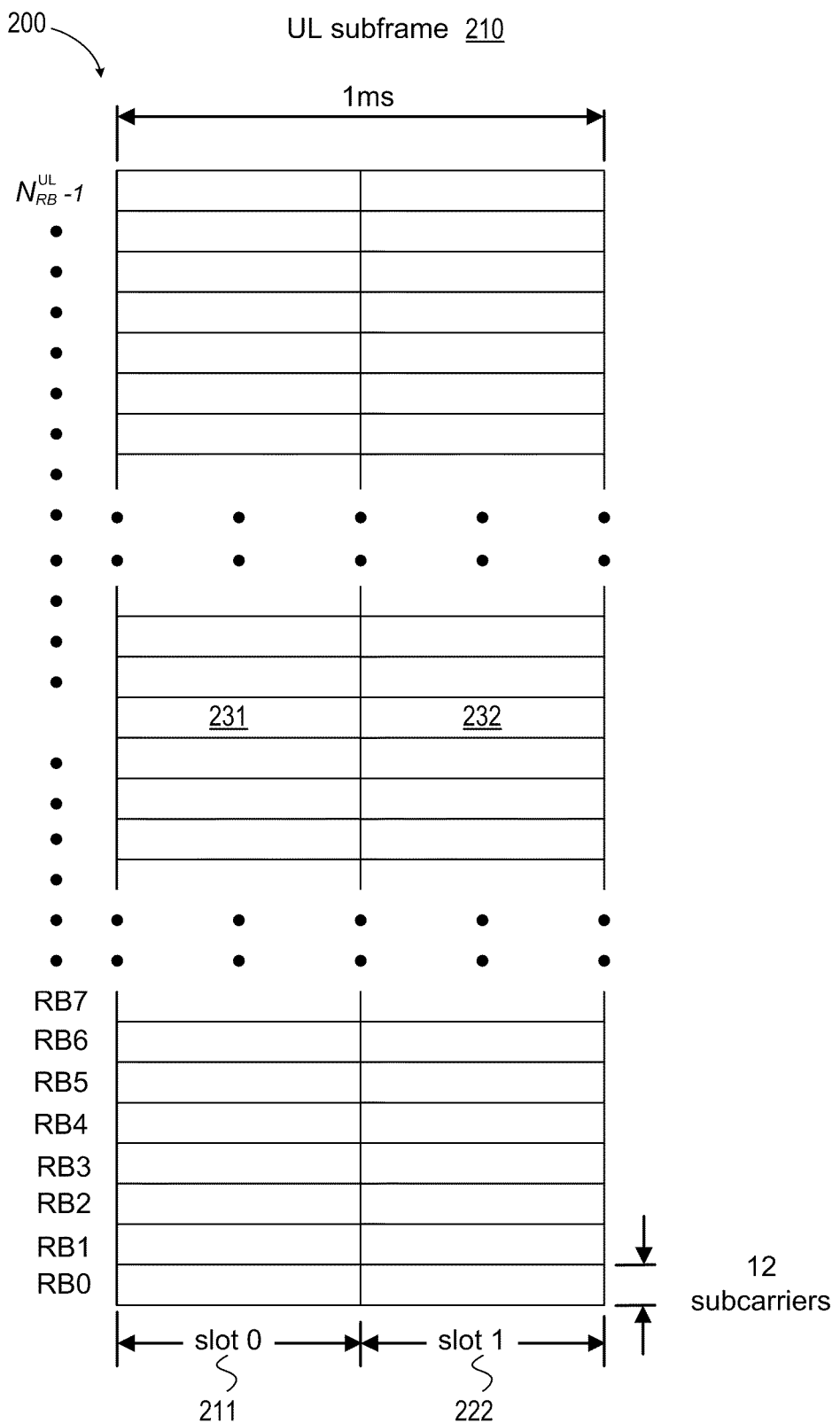
FIG. 2 is a diagram depicting an exemplary structure 200 for an uplink (UL) control channel.

A PUCCH is transmitted from the UE 110 to the eNB 102 on one or more UL orthogonal resources 108 in an uplink (UL) control channel. FIG. 2 is a diagram depicting an exemplary structure 200 for an uplink (UL) control channel. The structure 200 comprises an UL subframe 210 that is divided into a plurality of resource blocks (RBs) in subcarriers in the frequency domain and into 2 slots (e.g., 211 and 222) in the time domain such that each RB (e.g., 231) is positioned in a slot. In the illustrated example, the UL subframe 210 is 1 ms long, and the RBs 220 range from RB1 to $N_{RB}^{UL}$, where $N_{RB}^{UL}$ corresponds to a maximum number of RBs in the UL control channel. In an exemplary embodiment, each RB (e.g., 231) includes 12 subcarriers in the frequency domain. In some aspects, an single RB is positioned across the 2 slots, (e.g., 211 and 222) in the time domain. In such aspects, the RB may or may not be positioned across the 2 slots within the same frequency subcarrier. For example, an RB may be mirror-hopped such that it occupies a subcarrier near the bottom of the frequency range in slot 1, and also occupies a subcarrier near the top of the frequency range in slot 2.

In some aspects the teachings herein may be employed in a network that includes macro scale coverage (e.g., a large area cellular network such as a 3G (Third Generation) networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

Figure 3:
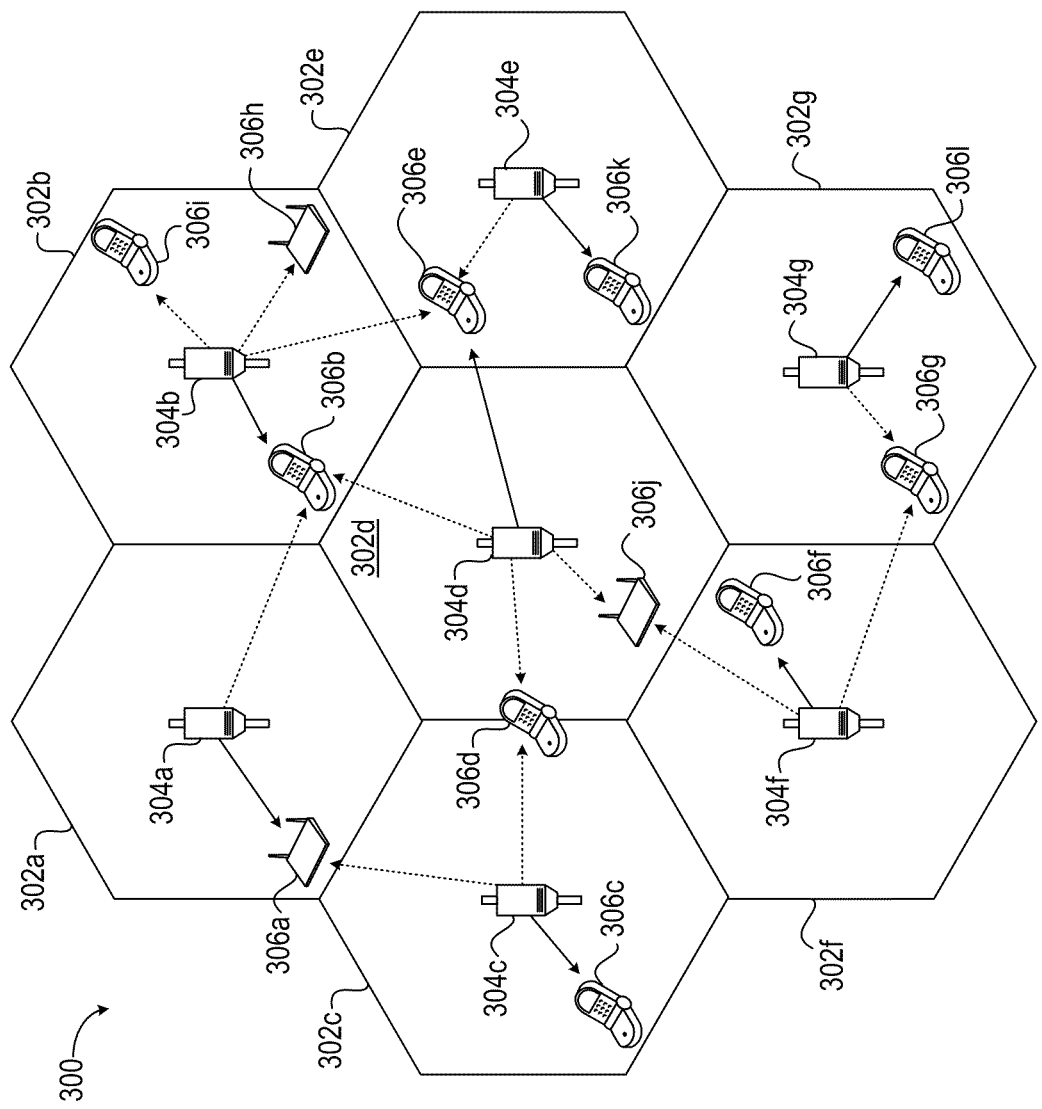
FIG. 3 is a diagram illustrating a wireless communication system configured to support a number of users.

FIG. 3 illustrates a wireless communication system 300, configured to support a number of users, in which the teachings herein may be implemented. The system 300 provides communication for multiple cells 302, such as, for example, macro cells 302a-302g, with each cell being serviced by a corresponding access node 304 (e.g., access nodes 304a-304g). As shown in FIG. 3, access terminals 306 (e.g., access terminals 306a-306l) may be dispersed at various locations throughout the system over time. Each access terminal 306 may communicate with one or more access nodes 304 on a forward link ("FL") and/or a reverse link ("RL") at a given moment, depending upon whether the access terminal 306 is active and whether it is in soft handoff, for example. The wireless communication system 300 may provide service over a large geographic region. For example, macro cells 302a-302g may cover a few blocks in a neighborhood.

Figure 4:
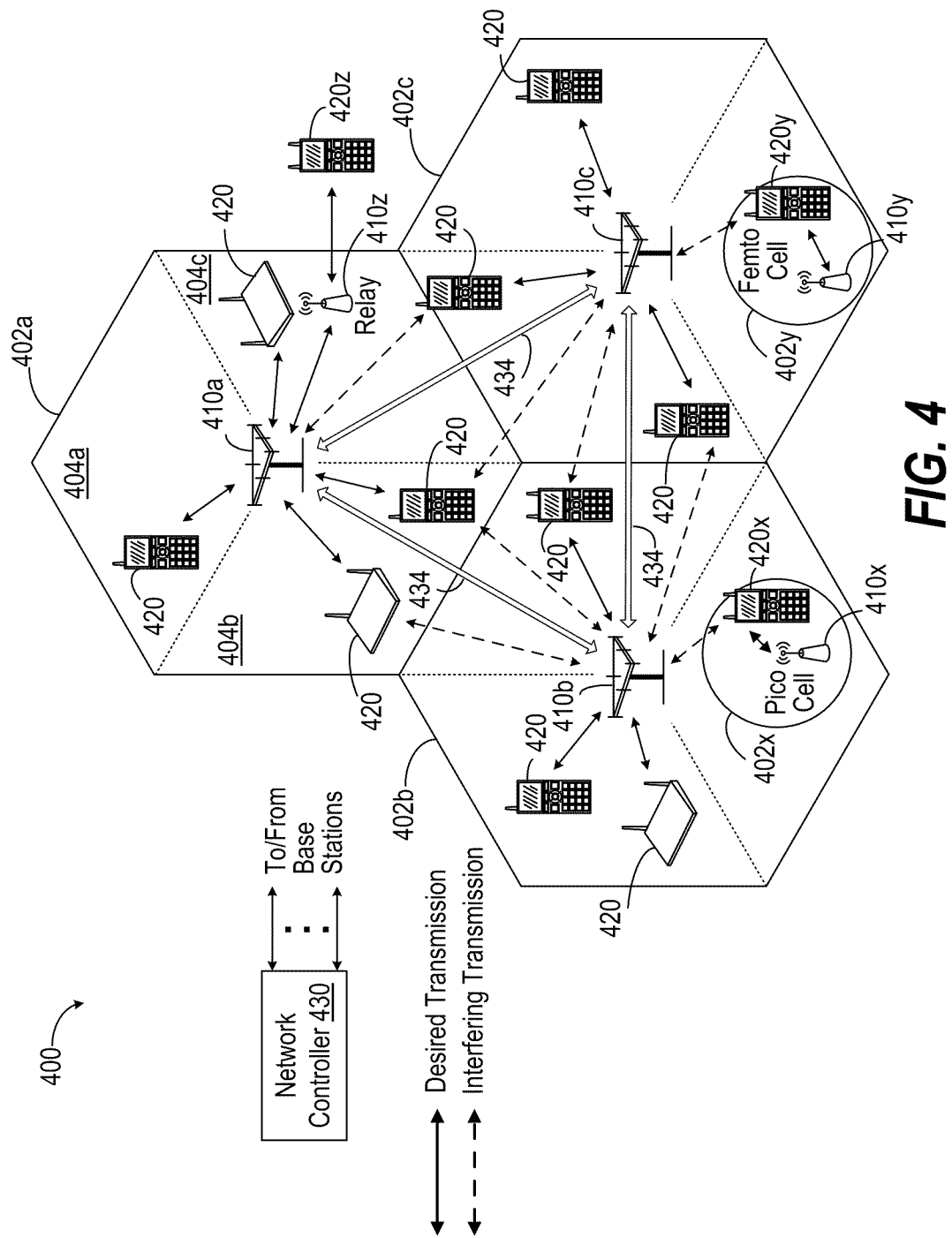
FIG. 4 is a diagram illustrating a wireless communication system comprising macro cells, femto cells and pico cells.

In the example shown in FIG. 4, base stations 410a, 410b and 410c may be macro base stations for macro cells 402a, 402b and 402c, respectively. Base station 410x may be a pico base station for a pico cell 402x communicating with terminal 420x. Base station 410y may be a femto base station for a femto cell 402y communicating with terminal 420y. Although not shown in FIG. 4 for simplicity, the macro cells may overlap at the edges. The pico and femto cells may be located within the macro cells (as shown in FIG. 4) or may overlap with macro cells and/or other cells.

Wireless network 400 may also include relay stations, e.g., a relay station 410z that communicates with terminal 420z. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals. A relay station may transmit and/or receive low reuse preambles. For example, a relay station may transmit a low reuse preamble in similar manner as a pico base station and may receive low reuse preambles in similar manner as a terminal.

A network controller 430 may couple to a set of base stations and provide coordination and control for these base stations. Network controller 430 may be a single network entity or a collection of network entities. Network controller 430 may communicate with base stations 410 via a backhaul. Backhaul network communication 434 can facilitate point-to-point communication between base stations 410a-410c employing such a distributed architecture. Base stations

410*a*-410*c* may also communicate with one another, e.g., directly or indirectly via wireless or wireline backhaul.

Wireless network 400 may be a homogeneous network that includes only macro base stations (not shown in FIG. 4). Wireless network 400 may also be a heterogeneous network that includes base stations of different types, e.g., macro base stations, pico base stations, femto (home) base stations, relay stations, etc. These different types of base stations may have different transmit power levels, different coverage areas, and different impact on interference in wireless network 400. For example, macro base stations may have a high transmit power level (e.g., 20 Watts) whereas pico and femto base stations may have a low transmit power level (e.g., 9 Watt). The techniques described herein may be used for homogeneous and heterogeneous networks.

Terminals 420 may be dispersed throughout wireless network 400, and each terminal may be stationary or mobile. A terminal may also be referred to as an access terminal (AT), a mobile station (MS), user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 4, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

Wireless network 400 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as a Global Positioning System (GPS).

In one aspect, to improve system capacity, the coverage area 402*a*, 402*b*, or 402*c* corresponding to a respective base station 410*a*-410*c* can be partitioned into multiple smaller areas (e.g., areas 404*a*, 404*b*, and 404*c*). Each of the smaller areas 404*a*, 404*b*, and 404*c* can be served by a respective base transceiver subsystem (BTS, not shown). As used herein and generally in the art, the term "sector" can refer to a BTS and/or its coverage area depending on the context in which the term is used. In one example, sectors 404*a*, 404*b*, 404*c* in a cell 402*a*, 402*b*, 402*c* can be formed by groups of antennas (not shown) at base station 410, where each group of antennas is responsible for communication with terminals 420 in a portion of the cell 402*a*, 402*b*, or 402*c*. For example, a base station 410 serving cell 402*a* can have a first antenna group corresponding to sector 404*a*, a second antenna group corresponding to sector 404*b*, and a third antenna group corresponding to sector 404*c*. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

Figure 5:
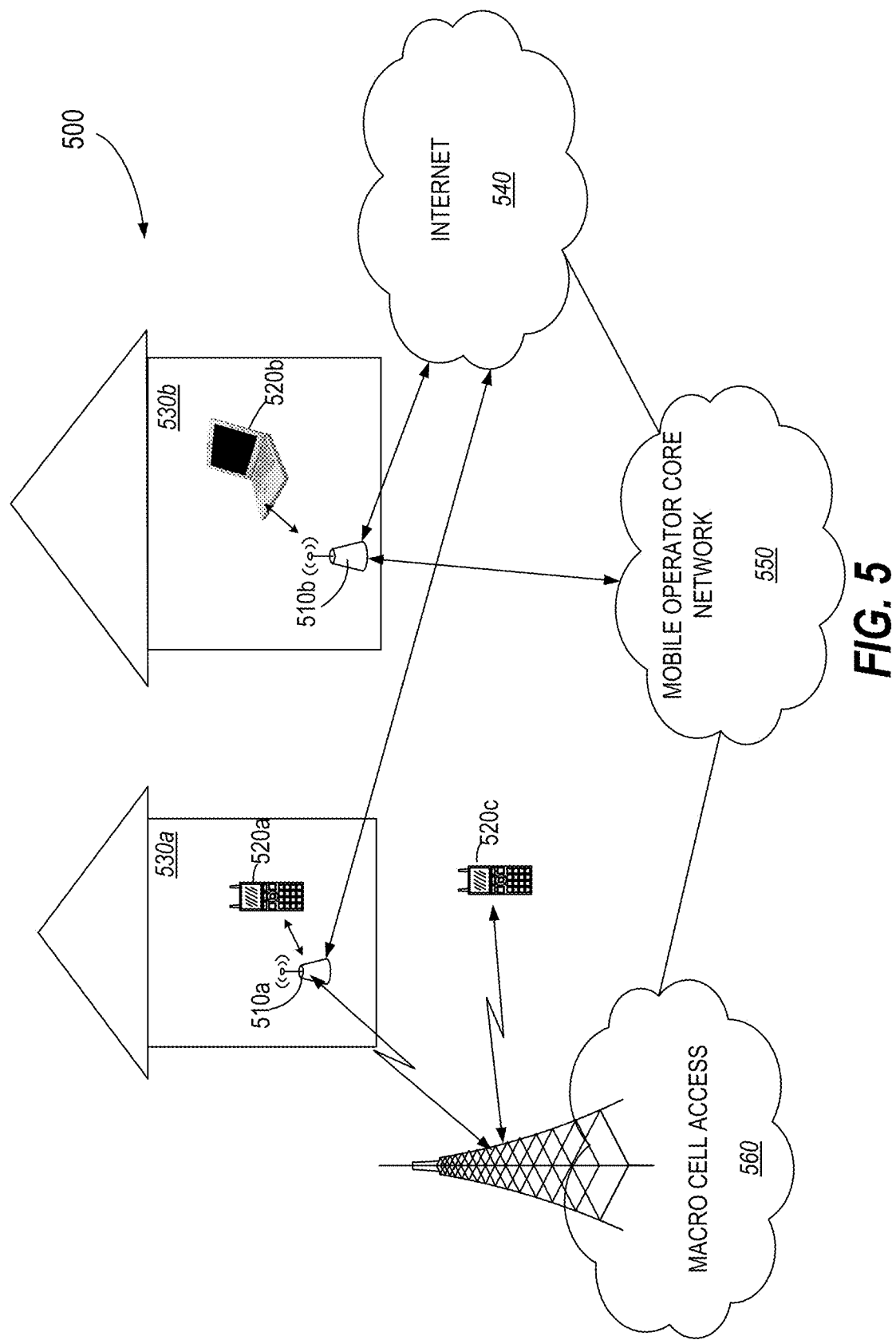
FIG. 5 is a diagram illustrating a communication system where one or more femto nodes are deployed within a network environment.

FIG. 5 illustrates an exemplary communication system 500 where one or more femto nodes are deployed within a network environment. Specifically, the system 500 includes multiple femto nodes 510 (e.g., femto nodes 510*a* and 510*b*) installed in a relatively small scale network environment (e.g., user residences 530*a* and 530*b*). Each femto node 510 may be coupled to a wide area network 540 (e.g., the Internet). Each femto node 510 may also be coupled to a mobile operator core network 550 via a macro cell access 560 or via a DSL router, a cable modem, a wireless link, or other connectivity means (not shown). As will be discussed below, each femto node (e.g., 510*a* or 510*b*) may be configured to serve associated access terminals 520 (e.g., access terminal 520*a*) and, optionally, alien access terminals 520 (e.g., access terminal 520*b*). In other words, access to femto nodes may be restricted whereby a given access terminal (e.g., 520*a*) may be served by a set of designated (e.g., home) femto node(s) (e.g., 510*a*) but may not be served by any non-designated femto nodes (e.g., a neighbor's femto node 510*b*).

Figure 6:
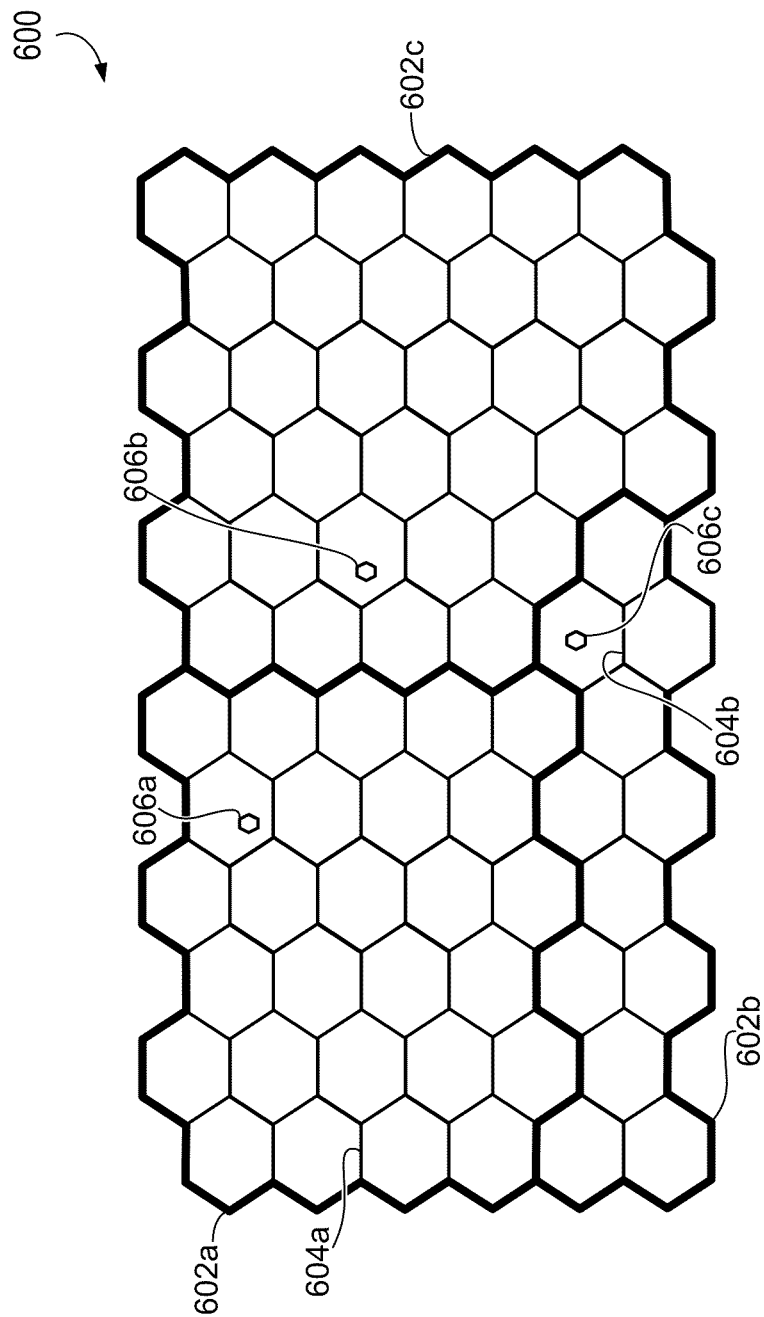
FIG. 6 is a diagram illustrating a coverage map where several tracking areas, routing areas or location areas are defined.

FIG. 6 illustrates an example of a coverage map 600 where several tracking areas 602 (or routing areas or location areas) are defined, each of which includes several macro coverage areas 604. Here, areas of coverage associated with tracking areas 602*a*, 602*b*, and 602*c* are delineated by the wide lines and the macro coverage areas 604 are represented by the hexagons. The tracking areas 602 also include femto coverage areas 606. In this example, each of the femto coverage areas 606 (e.g., femto coverage area 606*c*) is depicted within a macro coverage area 604 (e.g., macro coverage area 604*b*). It should be appreciated, however, that a femto coverage area 606 may not lie entirely within a macro coverage area 604. In practice, a large number of femto coverage areas 606 may be defined with a given tracking area 602 or macro coverage area 604. Also, one or more pico coverage areas (not shown) may be defined within a given tracking area 602 or macro coverage area 604.

Referring again to FIG. 5, the owner of a femto node 510 may subscribe to mobile service, such as, for example, 3G mobile service, offered through a macro cellular network (e.g., mobile operator core network 550). In addition, an access terminal 520 may be capable of operating both in macro environments and in smaller scale (e.g., residential) network environments. In other words, depending on the current location of the access terminal 520, a given access terminal (e.g., 520*c*) may be served by an access node 560 of the macro cellular network 550, or, alternatively, a given access terminal (e.g., 520*a* or 520*b*) may be served by any one of a set of femto nodes 510 (e.g., the femto nodes 510*a* and 510*b* that reside within a corresponding user residence 530*a* and 530*b*). For example, when a subscriber is outside his home, he is served by a standard macro access node (e.g., macro cell access 560) and when the subscriber is at home, he is served by a femto node (e.g., node 510*a*). Here, it should be appreciated that a femto node 510 may be backward compatible with existing access terminals 520.

A femto node 510 may be deployed on a single frequency or, in the alternative, on multiple frequencies. Depending on the particular configuration, the single frequency or one or more of the multiple frequencies may overlap with one or more frequencies used by a macro node (e.g., macro cell access 560).

In some aspects, an access terminal 520 may be configured to connect to a preferred femto node (e.g., the home femto node of the access terminal 520) whenever such connectivity is possible. For example, whenever the access terminal 520 is within the user's residence 530 (e.g., 530a or 530b), it may be desired that the access terminal 520 (e.g., 520a or 520b) communicate only with the home femto node 510 (e.g., 510a or 510b).

In some aspects, if the access terminal 520 operates within the macro cellular network 550 but is not residing on its most preferred network (e.g., as defined in a preferred roaming list), the access terminal 520 may continue to search for the most preferred network (e.g., the preferred femto node 510) using a Better System Reselection ("BSR"), which may involve a periodic scanning of available systems to determine whether better systems are currently available, and subsequent efforts to associate with such preferred systems. With the acquisition entry, the access terminal 520 may limit the search for specific band and channel. For example, the search for the most preferred system may be repeated periodically. Upon discovery of a preferred femto node 510, the access terminal 520 selects the femto node 510 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 510 that reside within the corresponding user residence 530). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the discussion above describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

Figure 7:
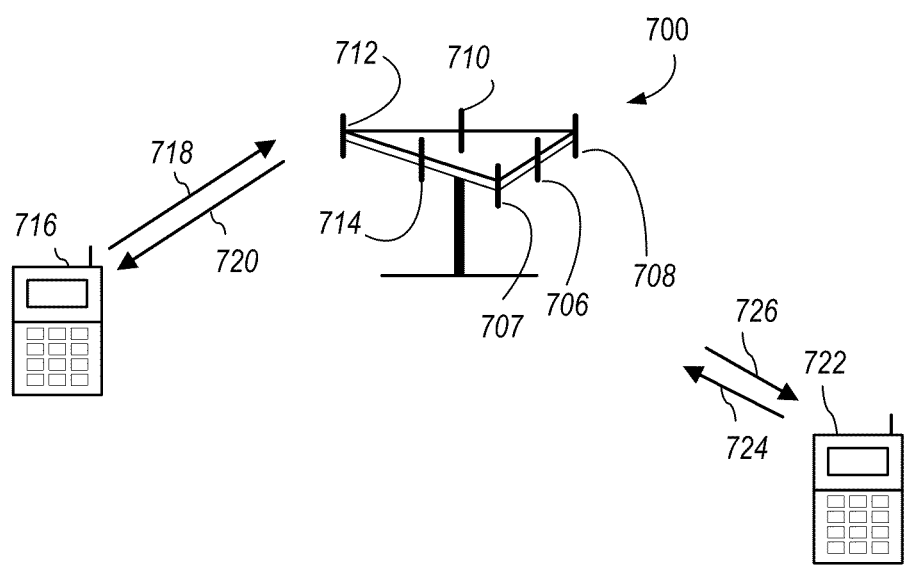
FIG. 7 is a diagram illustrating a multiple access wireless communication system.

Referring to FIG. 7, a multiple access wireless communication system according to one aspect is illustrated. An access point (AP) 700 includes multiple antenna groups, one including 707 and 706, another including 708 and 710, and an additional including 712 and 714. In FIG. 7, only two antennas are shown for each antenna group, however, more or fewer antennas may be utilized for each antenna group. User equipment (UE) 716 is in communication with antennas 712 and 714, where antennas 712 and 714 transmit information to the UE 716 over forward link 720 and receive information from the UE 716 over reverse link 718. User equipment (UE) 722 is in communication with antennas 706 and 708, where antennas 706 and 708 transmit information to the UE 722 over forward link 726 and receive information from the UE 722 over reverse link 724. In a FDD system, communication links 718, 720, 724 and 726 may use different frequencies for communication. For example, forward link 720 may use a different frequency then that used by reverse link 718.

Each group of antennas and/or the area in which they are designed to communicate is often referred to as a sector of the access point. In this aspect, antenna groups each are designed to communicate to access terminals in a sector of the areas covered by access point 700.

In communication over forward links 720 and 726, the transmitting antennas of access point 700 utilize beamforming in order to improve the signal-to-noise ratio of forward links for the different UEs 716 and 722. Also, an access point using beamforming to transmit to UEs scattered randomly through its coverage causes less interference to access terminals in neighboring cells than an access point transmitting through a single antenna to all of its access terminals.

An access point may be a fixed station used for communicating with the terminals and may also be referred to as an access point, a Node B, or some other terminology. An UE may also be called an access terminal, a wireless communication device, terminal, or some other terminology.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 8:
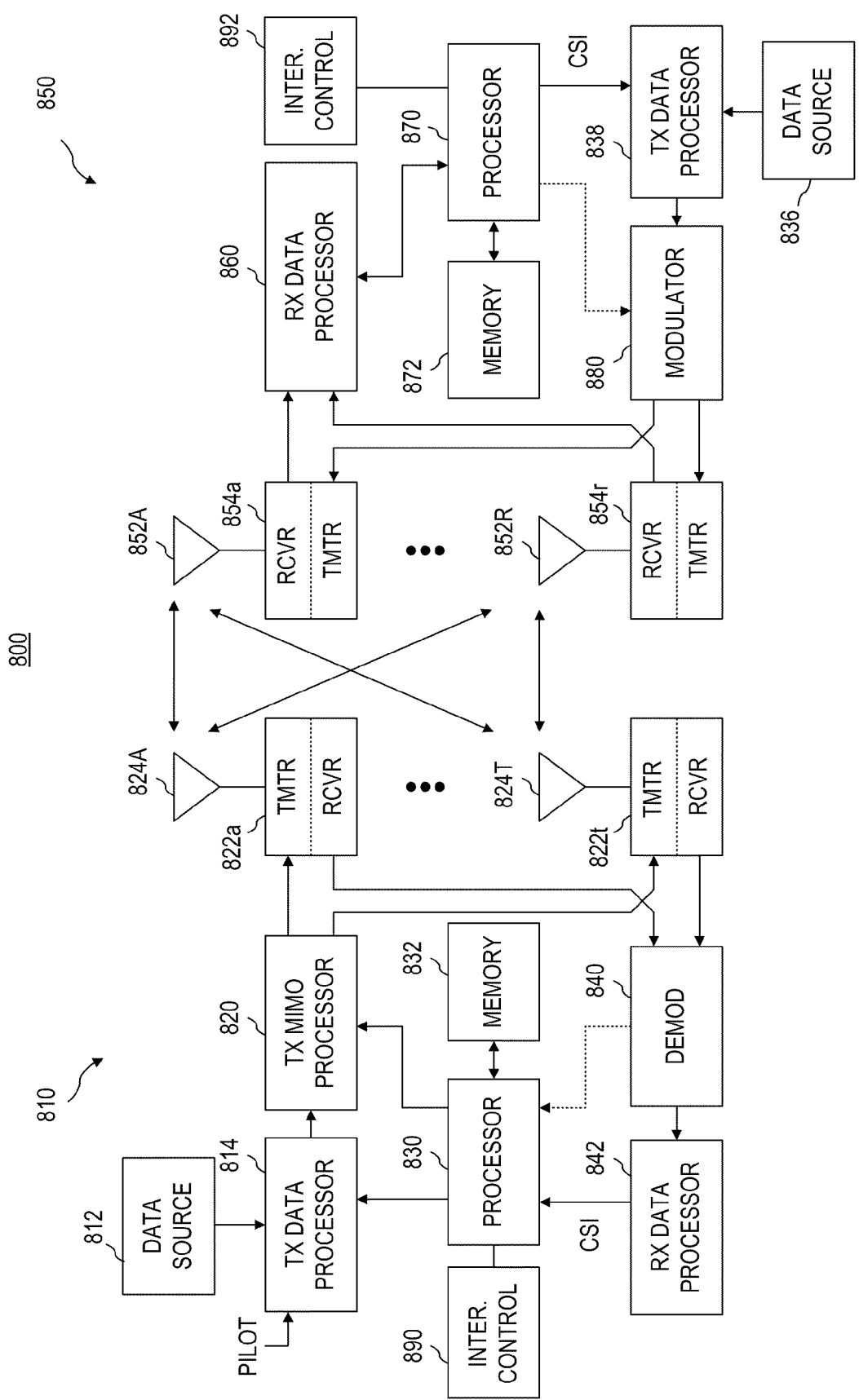
FIG. 8 is a schematic diagram of a multiple input multiple output (MIMO) communication system.

The teachings herein may be incorporated into a node (e.g., a device) employing various components for communicating with at least one other node. FIG. 8 depicts several sample components that may be employed to facilitate communication between nodes. Specifically, FIG. 8 illustrates a wireless device 810 (e.g., an access point) and a wireless device 850 (e.g., an access terminal) of a MIMO system 800. At the device 810, traffic data for a number of data streams is provided from a data source 812 to a transmit ("TX") data processor 814.

In some aspects, each data stream is transmitted over a respective transmit antenna. The TX data processor 814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 830. A data memory 832 may store program code, data, and other information used by the processor 830 or other components of the device 810.

The modulation symbols for all data streams are then provided to a TX MIMO processor 820, which may further process the modulation symbols (e.g., for OFDM). The TX MIMO processor 820 then provides $N_T$ modulation symbol streams to $N_T$ transceivers ("XCVR") 822a through 822t that each has a transmitter (TMTR) and receiver (RCVR). In some aspects, the TX MIMO processor 820 applies beam-forming weights to the symbols of the data streams and to the antenna from which the symbol is being transmitted.

Each transceiver 822a-822t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 822a through 822t are then transmitted from $N_T$ antennas 824a through 824t, respectively.

At the device 850, the transmitted modulated signals are received by $N_R$ antennas 852a through 852r and the received signal from each antenna 852a-852r is provided to a respective transceiver ("XCVR") 854a through 854r. Each transceiver 854a-854r conditions (e.g., filters, amplifies, and downconverts) a respective received signal, digitizes the conditioned signal to provide samples, and further processes the samples to provide a corresponding "received" symbol stream.

A receive ("RX") data processor 860 then receives and processes the $N_R$ received symbol streams from $N_R$ transceivers 854a-854r based on a particular receiver processing technique to provide $N_T$ "detected" symbol streams. The RX data processor 860 then demodulates, deinterleaves, and decodes each detected symbol stream to recover the traffic data for the data stream. The processing by the RX data processor 860 is complementary to that performed by the TX MIMO processor 820 and the TX data processor 814 at the device 810.

A processor 870 periodically determines which pre-coding matrix to use. The processor 870 formulates a reverse link message comprising a matrix index portion and a rank value portion. A data memory 872 may store program code, data, and other information used by the processor 870 or other components of the device 850.

The reverse link message may comprise various types of information regarding the communication link and/or the received data stream. The reverse link message is then processed by a TX data processor 838, which also receives traffic data for a number of data streams from a data source 836, modulated by a modulator 880, conditioned by the transceivers 854a through 854r, and transmitted back to the device 810.

At the device 810, the modulated signals from the device 850 are received by the antennas 824a-824t, conditioned by the transceivers 822a-822t, demodulated by a demodulator ("DEMOD") 840, and processed by a RX data processor 842 to extract the reverse link message transmitted by the device 850. The processor 830 then determines which pre-coding matrix to use for determining the beam-forming weights then processes the extracted message.

FIG. 8 also illustrates that the communication components may include one or more components that perform interference control operations. For example, an interference ("INTER.") control component 890 may cooperate with the processor 830 and/or other components of the device 810 to send/receive signals to/from another device (e.g., device 850). Similarly, an interference control component 892 may cooperate with the processor 870 and/or other components of the device 850 to send/receive signals to/from another device (e.g., device 810). It should be appreciated that for each device 810 and 850 the functionality of two or more of the described components may be provided by a single component. For example, a single processing component may provide the functionality of the interference control component 890 and the processor 830 and a single processing component may provide the functionality of the interference control component 892 and the processor 870.

Currently, UL Single Antenna Port Mode is defined in LTE Rel. 10. In this mode, the UE behavior is same as the UE behavior with single antenna from the eNB's perspective. Exact UE implementation has been left to UE vendors (e.g., PA architecture). PUCCH, and/or Physical Uplink Shared Channel (PUSCH), and/or Sounding Reference Signal (SRS) transmission can be independently configured for single uplink antenna port transmission, although detailed scenarios and operation have not been defined.

Uplink (UL) Single Antenna Port Mode is the default operation mode before eNB is aware of the UE transmit antenna configuration. Transmit diversity schemes employing multiple PUCCH resources are available for enhanced performance. In particular, Spatial Orthogonal-Resource Transmit Diversity (SORTD) is applied where the same modulated symbol d(0) is transmitted on different orthogonal resources from different antennas. Resource allocation remains to be defined. PUCCH format 2/2a/2b also remains to be addressed.

Multiple-resource PUCCH for four transmit antennas (4Tx) can be achieved by applying 2Tx Transmit Diversity (TxD) over two virtual antennas with virtualization details being left as a UE implementation issue.

The PUCCH may be divided into different formats. With regard to PUCCH modes in Rel-8, the following combinations of UL control information on PUCCH are supported:

ACK/NACK with format 1a or 1b;
ACK/NACK with format 1b with channel selection;
SR with format 1;
ACK/NACK+SR with format 1a or 1b;
CQI with format 2; and
CQI+ACK/NACK with format 2a or 2b for normal CP, format 2 for extended CP.

As indicated above with respect to FIG. 1, the physical uplink control channel (PUCCH) is an uplink access link from the UE 110 to an evolved Base Node (eNB) 102. The PUCCH may be used to transmit control information to the eNB 102 indicating an acknowledgement and/or a negative acknowledgement (ACK/NACK), a channel quality indicator (CQI) and/or a scheduling request (SR). PUCCH may be seen, from a point of view of the UE 110, as one resource block (RB) comprising, for example, 12 subcarriers in a frequency domain and one slot in a time domain.

I. Dynamic Scheduling of ACK/NACK

In most cases, scheduling is fully dynamic. In the downlink direction, resources are assigned when data is available. For data to be sent in the uplink, the UE dynamically requests transmission opportunities whenever data arrives in the UE's uplink buffer. Information about data being sent in the downlink direction and uplink transmission opportunities are carried in the radio layer control channel which is sent at the beginning of each subframe.

For PDSCH (Physical Downlink Shared Channel) transmission with corresponding PDCCH (Physical Downlink Control Channel) in subframe n-4:

$$n^{(1)}_{PUCCH} = n_{CCE} + N^{(1)}_{PUCCH}$$

$n_{CCE}$ is the index of first CCE (Control Channel Element) for the corresponding DCI (Downlink Control Information) assignment $N^{(1)}_{PUCCH}$ is a higher layer configured number For PDSCH transmission without PDCCH in subframe n-4: PUCCH resource index is configured by higher layers and informed by "TPC command" value at semi-persistent scheduling (SPS) activation. A resource is mapped from $n^{(1)}_{PUCCH}$ by applying an orthogonal sequence index and a cyclic shift.

A physical resource is determined by $n^{(1)}_{PUCCH}$ by first determining m, which is the RB index for bandwidth used for PUCCH; and then from m, getting a physical RB index in an even slot and odd slot.

FIG. 9 is a diagram 900 illustrating ACK/NACK feedback by a Release-8 (Rel-8) LTE UE in Frequency Division Duplex (FDD) operation. Shown in the diagram 900 is a DL subframe n-4 910 that includes a first control channel element (CCE) 911 and a second CCE 912 and a DL data channel (e.g., PDSCH) 915. In this manner, a downlink (DL) data transmission is made from an eNB to a UE with data on the DL data channel 915 along with Downlink Control Information (DCI) in the first CCE 911 and a (DCI) on the second CCE 912 in the DL subframe n-4 910. In response, an ACK/NACK 949 corresponding to the DL data transmission 901 is sent from the UE to the eNB in an UL control channel (e.g., PUCCH). In this regard, the first CCE 911 carrying the DCI points (as shown by arrow 901) to a resource block (RB 941) and the corresponding orthogonal resource index in UL subframe 940. In the example shown in FIG. 9, resource block RB 941 is mirror-hopped across the two slots of UL subframe 940.

In Rel-8 LTE standard for TDD, two ACK/NACK modes are supported. In a first ACK/NACK mode, ACK/NACK messages are bundled into one resource in a UL subframe 940, and in a second ACK/NACK mode, ACK/NACK messages are multiplexed in multiple resources in a UL subframe 940. For UL-DL configuration 5: DSUDDDDDDD, only the first (bundling)ACK/NACK mode is supported.

FIG. 10 is a diagram illustrating ACK/NACK feedback by a Rel-8 LTE UE in Time Division Duplex (TDD) operation. A first downlink (DL) data transmission is made from an eNB to a UE with data on a DL data channel (e.g., PDSCH) 1015 along with Downlink Control Information (DCI) on a first CCE 1011 and a second CCE 1012 in a first DL subframe 1010. Subsequently, a second DL data transmission is made from the eNB to the UE with data on a DL data channel (e.g., PDSCH) 1025 along with a DCI on a first CCE 1021, a second CCE 1022 and a third CCE 1023 in a second DL subframe 1020. The scheduled CCEs in DL subframes 1010 and 1020 are used to indicate (as shown by arrows 1001 and 1002) scheduled resource blocks in UL subframe 1040 to be used for PUCCH by the UE. For example, CCE 1011 corresponds to the resource block RB1 1041 in UL subframe 1040, and CCE 1021 corresponds to the resource block RB2 1042 in UL subframe 1040. In the example shown in FIG. 10, resource blocks RB 1041 and RB 1042 are mirror-hopped across the two slots of UL subframe 1040.

In the first (bundling) ACK/NACK mode in LTE Rel. 8 TDD, ACK/NACK messages 1049 corresponding to the DL Subframe 1 and the DL Subframe 2 are bundled in one resource block (e.g., RB1 1041) and are transmitted from the UE to the eNB in an UL control channel (e.g., PUCCH) on the resource block. By way of example, the ACK/NACK bundling can be performed per codeword across M DL subframes associated with a single UL subframe n by AND operation.

In the second (multiplexing) ACK/NACK mode in LTE Rel. 8 TDD, a first portion of ACK/NACK messages 1049 corresponding to the DL Subframe 1 is transmitted from the UE to the eNB on a first resource block (e.g., RB1 1041), and a second portion of the ACK/NACK messages 1049 corresponding to the second DL Subframe 2 is transmitted from the UE to the to the eNB on a second resource block (e.g., RB2 1042). For example, if M>1, a spatial bundling is performed across multiple codewords in each DL subframe by AND operation. PUCCH format 1b with channel selection can be used with the ACK/NACK messages transmitted in 2 bits. If M=1, on the other hand, no spatial bundling is performed since only one DL subframe is associated with the single UL Subframe.

The following are exemplary equations that may be used for PUCCH allocations under different ACK/NACK modes and/or different number (M) of subframes.

A. ACK Bundling or M=1

$$n^{(1)}_{PUCCH} = (M-m-1) \times N_p + m \times N_{p+1} + n_{CCE} + N^{(1)}_{PUCCH}$$

$$N_p = \max\{0, \lfloor N^{DL}_{RB} \times (N^{RB}_{sc} \times p - 4)/36 \rfloor\}$$

$$N_p \le n_{CCE} < N_{p+1},$$

where m is an index of the smallest k_m in the set of K={k_0, k_1, k_M−1} such that UE detects PDCCH in subframe n-k_m, and n CCE is the number of the first CCE for that PDCCH. In this scheme, each CCE in each DL subframe in K is mapped to a different resource.

B. ACK Multiplexing (M>1)

$n^{(1)}_{PUCCH,i}=(M-i-1)\times N_p+i\times N_{p+1}+n_{CCE,i}+N^{(1)}_{PUCCH}$ for each k_i such that a PDCCH is sent in n-k_i.

In this scheme, since there are multiple resources that can be used to feedback the ACK, a channel selection is used.

According to an embodiment of the invention, an eNB can configure LTE-A UE to transmit ACK/NACK in a single antenna port mode utilizing a single resource or in a SORTD mode utilizing multiple resources. In the single antenna port mode, similar to Rel-8 operation, the UE transmits ACK/NACK over a single orthogonal resource. The use of a single antenna port mode is better than that of a SORTD mode when there exists a large amount of Antenna Gain Imbalance (AGI) between transmit antennas, for example.

In the SORTD mode, depending on the actual scenario and the higher layer configuration, the UE can employ multiple resources (to take advantage of SORTD mode) or a single resource (as in single antenna port mode) to feedback the ACK/NACK. In the SORTD mode, if the UE determines that there are multiple PUCCH resources available for ACK/NACK feedback, the UE applies SORTD over two orthogonal PUCCH resources selected from the set of available resources. Otherwise, if the UE determines that multiple PUCCH resources are not available, the UE simply employs a single antenna port mode for ACK/NACK transmission.

Figure 11A:
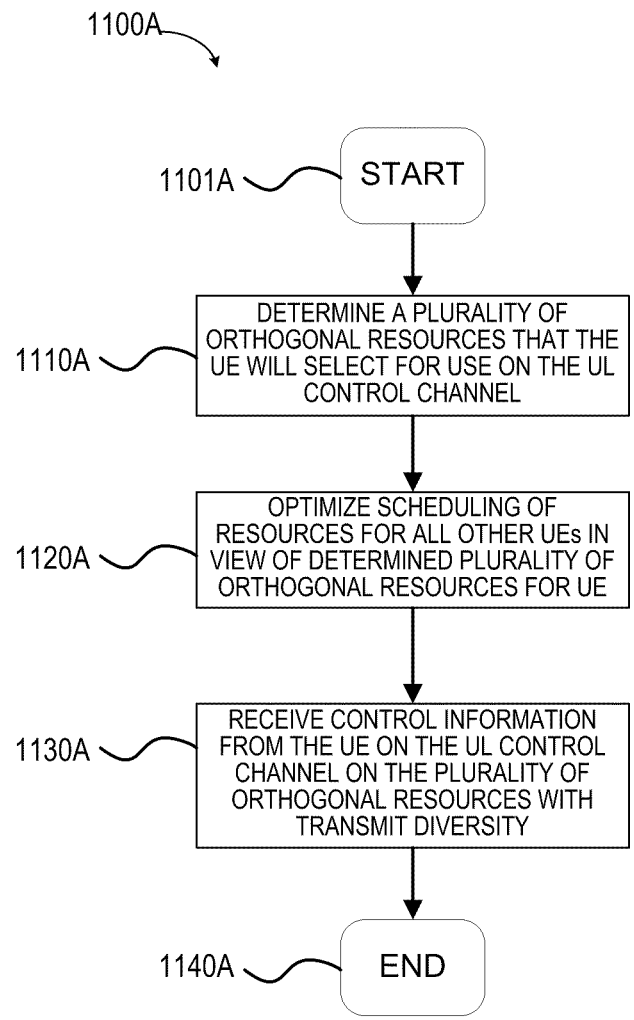
FIG. 11A is a flowchart illustrating an exemplary process for an uplink (UL) control channel resource allocation for Spatial Orthogonal-Resource Transmit Diversity (SORTD) from a perspective of an evolved nodeB (eNB).

FIG. 11A is a flowchart illustrating an exemplary process 1100A for an uplink (UL) control channel resource allocation in a SORTD mode from a perspective of an eNB. For ease of illustration without any intent to limit the scope of the present disclosure in any way, the process 1100A will be described with reference to FIG. 1. In this embodiment for SORTD mode, it is assumed that the eNB has already received control information from the UE 110 on an UL control channel which indicates that the UE 110 has multiple antennas 124, e.g., for MIMO operation. For example, the eNB 102 may have already received such an indication from the UE 110 at the time the UE 110 enters the network or the cell of the eNB 102. The process 1100A begins at start state 1101A and proceeds to operation 1110A in which the eNB 102 determines, by a pre-established algorithm, a plurality of orthogonal resources that the UE 110 will select for use by the UE 110 on the UL control channel. In this regard, the UE 110 will be selecting the plurality of orthogonal resources according to the pre-established algorithm.

The process 1100A proceeds to operation 1120A in which the eNB 102 and/or the eNB scheduler 104 optimizes the scheduling of resources for use by all other UEs being serviced by eNB 102, taking into account the determined plurality of orthogonal resources that the UE 110 will select for use by the UE 110 on the UL control channel.

The process 1100A proceeds to operation 1130A in which the eNB 102 receives control information from the UE 110, such as ACK/NACK feedback or other control information, on the UL control channel on the selected plurality of orthogonal resources with transmit diversity. The process 1100A terminates at end state 1140A.

Figure 11B:
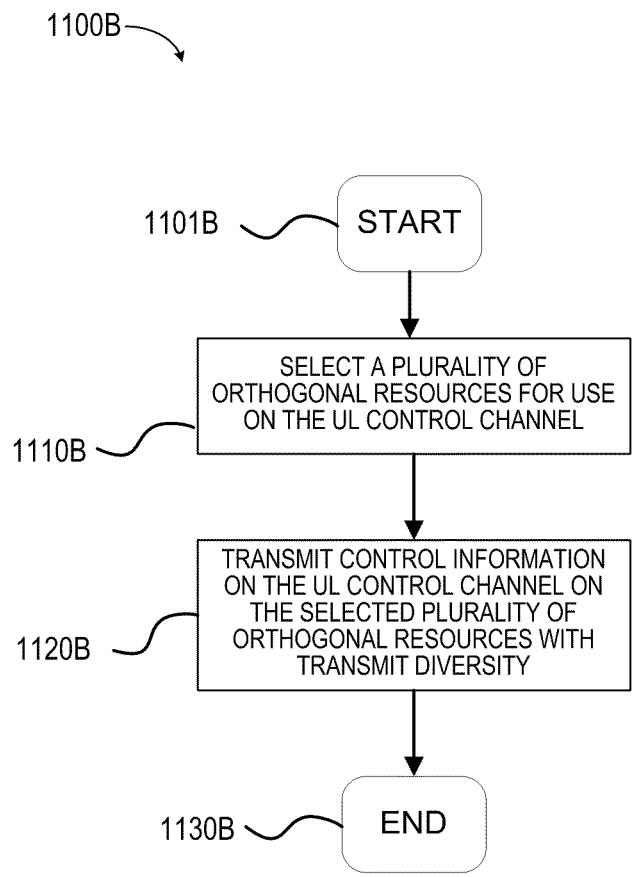
FIG. 11B is a flowchart illustrating an exemplary process for an uplink (UL) control channel resource allocation for SORTD from a perspective of a user equipment (UE).

FIG. 11B is a flowchart illustrating an exemplary process 1100B for an uplink (UL) control channel resource allocation in a SORTD mode from a perspective of a UE. For ease of illustration without any intent to limit the scope of the present disclosure in any way, the process 1100B will be described again with reference to FIG. 1. The process 1100B begins at start state 1101B and proceeds to operation 1110B in which the UE 110 selects, by a pre-established algorithm, a plurality of orthogonal resources that the UE 110 will use for the UL control channel. The process 1100B proceeds to operation 1120B in which the UE 110 transmits control information, such as ACK/NACK feedback or other control information, on the UL control channel on the selected plurality of orthogonal resources, with transmit diversity. The process 1100B terminates at end state 1130B.

II. SORTD for FDD: ACK/NACK

Various exemplary embodiments of UL control channel resource allocations for SORTD ACK/NACK feedback in frequency division duplex (FDD) operation are now described. In FDD operation, Downlink Control Information (DCI) including resource allocation and other control information for a UE can be transmitted using one or more CCEs in a single component (DL) carrier or multiple component (DL) carriers. Embodiments corresponding to these alternative situations are described below.

A. Single Component DL Carrier

In an FDD operation which uses a single component DL carrier, when an aggregation level of the corresponding DCI is greater than 1 (multiple CCEs in each DL frame), the eNB scheduler 104 (FIG. 1) does not need to perform an additional resource allocation since multiple resources linked with the CCEs in the DCI have been reserved and SORTD can be applied over two of them.

When the aggregation level of the corresponding DCI is equal to 1 (one CCE in each DL frame), however, several possible approaches exist for scheduling resources for use by UE 110 in the UL control channel. In one approach, a single antenna port mode is applied for ACK/NACK feedback when the UE is not at cell edge and the single antenna port mode is good enough because the UL signal quality from UE 110 to eNB 102 is sufficiently strong and does not require transmit diversity.

Figure 12A:
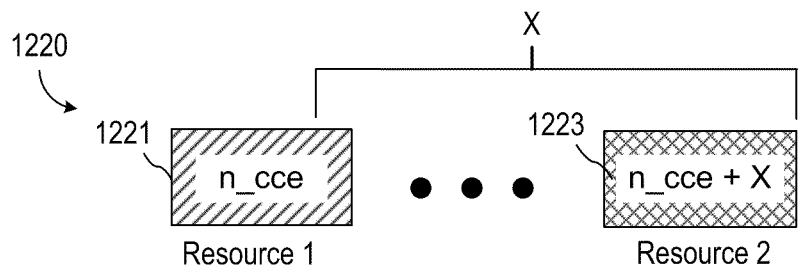
FIG. 12A is a diagram illustrating an exemplary resource scheduling scheme for SORTD ACK/NACK in a single component DL carrier configuration in FDD operation.

In another approach, a SORTD scheduling scheme illustrated by FIG. 12A is applied in which a predetermined algorithm is used by which the eNB scheduler guarantees a second resource 1223 linked with a CCE having an index of n_cce+X will not be scheduled for use by others to feedback ACK/NACK. Here, n_cce is the index of a first CCE for the corresponding DCI, the first CCE being linked with a first resource 1221, and X is a higher layer configurable parameter (e.g., a nonzero integer which can be either positive or negative). In the illustrated example of FIG. 12A, the second resource is offset from the first resource by 3 (X=3). In this manner, the UE can use the same predetermined algorithm to select a second resource for use on the UL control channel.

Figure 12B:
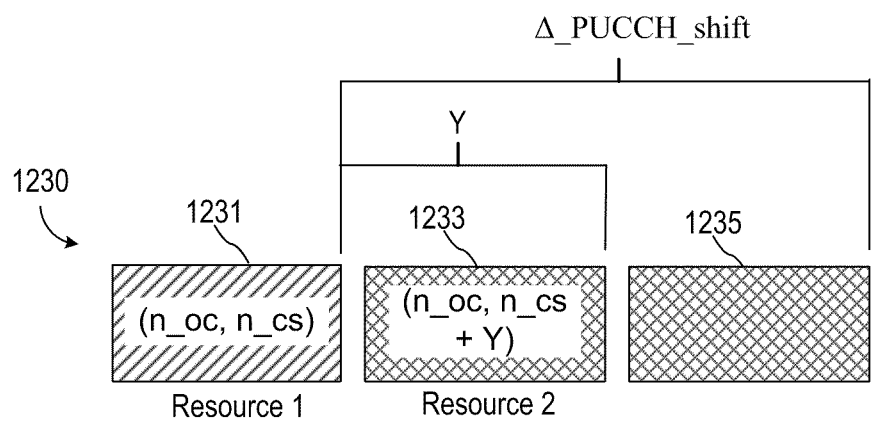
FIG. 12B is a diagram illustrating another exemplary resource scheduling scheme for SORTD ACK/NACK in a single component DL carrier configuration in FDD.

In yet another approach, a SORTD scheduling scheme related to cyclic shift as illustrated by FIG. 12B is applied in which, when Δ_PUCCH_shift>1, a second resource can be selected by UE 110 for use by UE 110 on the UL control channel based on a position offset from a first resource that is less than the cyclic shift separation of scheduled resources. By way of example, the eNB 102 sets a parameter "closer-CS-usable" to True, and then SORTD can be applied over a first resource (n_oc, n_cs) linked with n_cce and a second resource (n_oc, n_cs+Y) which is offset from the first resource by Y, where Y is less than a cyclic shift separation (Δ_PUCCH_shift) between resources for the UL control channel. An advantage of this scheme is that SORTD can be applied even when DCI contains only one CCE by using resources in between the cyclic shift separation of resources that are scheduled by eNB for use by other UEs, for example. In this manner, the UE can use the same predetermined algorithm to select a second resource for use on the UL control channel.

Figure 13A:
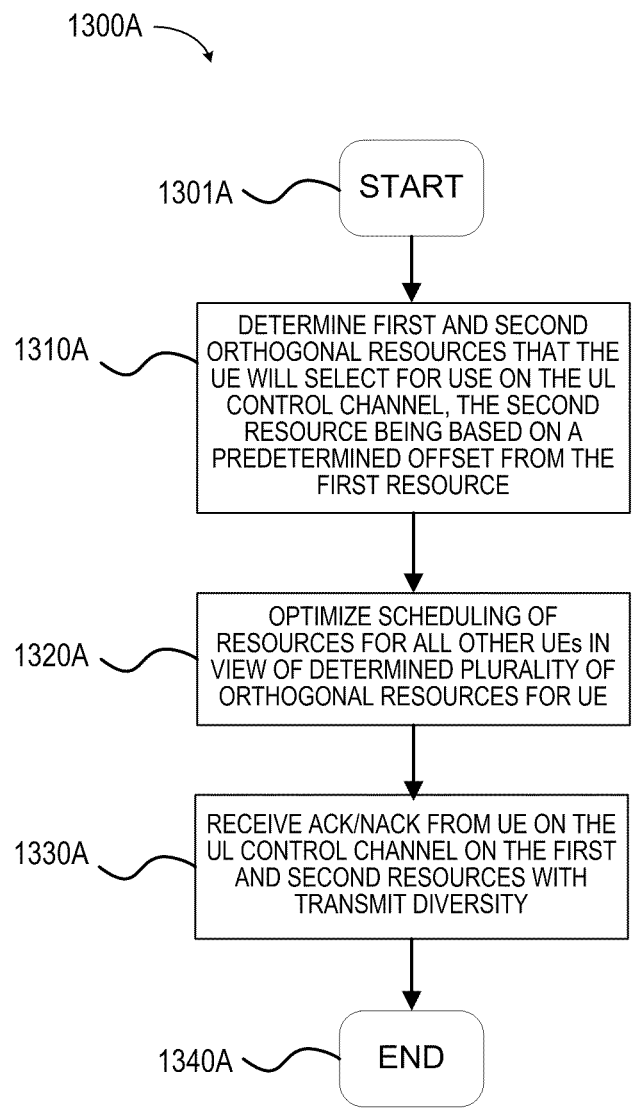
FIG. 13A is a flowchart illustrating an exemplary process for SORTD ACK/NACK feedback for a single component DL carrier in FDD operation from a perspective of an eNB.

FIG. 13A is a flowchart illustrating an exemplary process 1300A for SORTD ACK/NACK feedback for a single component carrier in FDD operation from a perspective of an eNB. For ease of illustration without any intent to limit the scope of the present disclosure in any way, the process 1300A will be described with reference to FIG. 1. In SORTD mode, it is assumed that the eNB has already received control information from the UE 110 on an UL control channel which indicates that the UE 110 has multiple antennas 124, e.g., for MIMO operation. For example, the eNB 102 may have already received such an indication from the UE 110 at the time the UE 110 enters the network or the cell of the eNB 102. The process 1300A begins at start state 1301A and proceeds to operation 1310A in which the eNB 102 determines, by a pre-established algorithm, a plurality of orthogonal resources that the UE 110 will select for use by the UE 110 on the UL control channel. In particular, eNB 102 determines that the UE 110 will select a first resource and a second resource, the second resource being offset from the first resource by predetermined offset, as discussed above with respect to FIG. 12A. In this regard, the UE 110 will be selecting the plurality of orthogonal resources according to the pre-established algorithm.

In the illustrated example of FIG. 12A, the predetermined offset is X, which can be any nonzero integer, positive or negative. In the illustrated example of FIG. 12B, the predetermined offset is Y, which is less than a cyclic shift separation (Δ_PUCCH_shift) between resources for the UL control channel.

The process 1300A proceeds to operation 1320A in which the eNB 102 and/or the eNB scheduler 104 optimizes the scheduling of resources for use by all other UEs being serviced by eNB 102, taking into account the determined plurality of orthogonal resources that the UE 110 will select for use by the UE 110 on the UL control channel. The process 1300A proceeds to operation 1330A in which the eNB 102 receives control information from the UE 110, such as ACK/NACK feedback or other control information, on the UL control channel on the selected first and second orthogonal resources with transmit diversity.

Figure 13B:
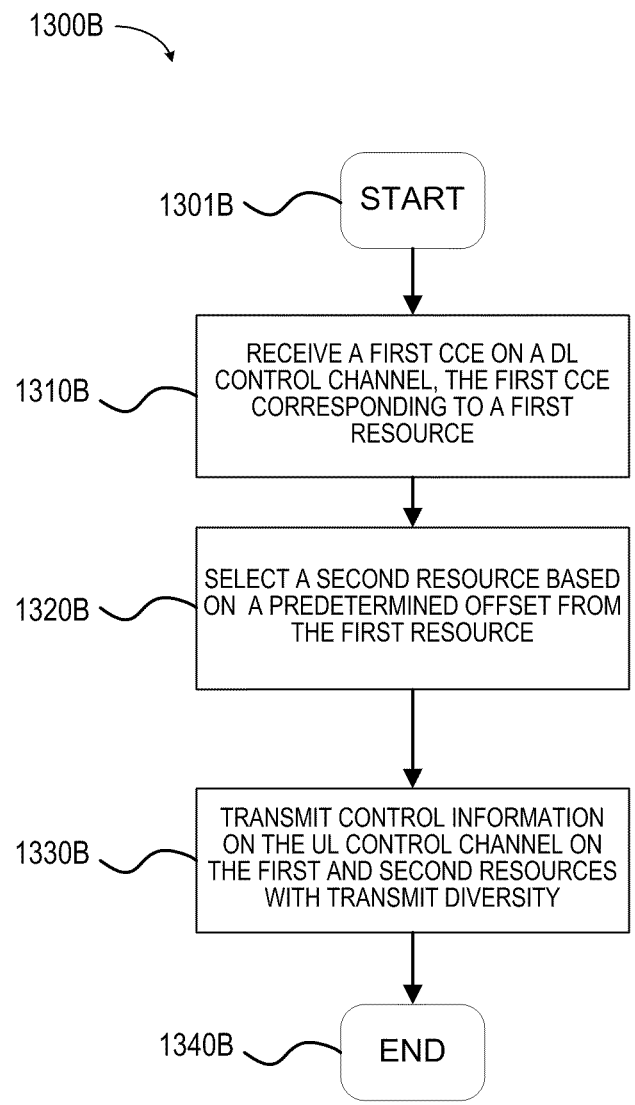
FIG. 13B is a flowchart illustrating an exemplary process for SORTD ACK/NACK feedback for a single component DL carrier in FDD operation from a perspective of a UE.

FIG. 13B is a flowchart illustrating an exemplary process 1300B for SORTD ACK/NACK feedback for a single component carrier in FDD operation from a perspective of a UE. The process 1300B begins at start state 1301B and proceeds to operation 1310B in which the UE 110 receives a first control channel element (CCE) on a DL control channel (e.g., PDCCH), where the first CCE corresponds to a first resource. The process 1300B proceeds to operation 1320B selects a second resource which is offset from the first resource by a predetermined offset. The predetermined offset can be X or Y as described above with respect to the aspects described in FIG. 12A and FIG. 12B, respectively. The process 1300B proceeds to operation 1330B in which UE 110 transmits control information, such as ACK/NACK feedback or other control information, on the UL control channel on the selected first and second orthogonal resources, with transmit diversity. The process 1300B terminates at end state 1340B.

B. Multiple Component Carriers

In certain FDD embodiments, DL data transmission (e.g., PDSCH) from an eNB to a UE occurs in multiple DL carriers. For example, when PDSCH to a UE is over multiple DL carriers and N×SC-FDM is allowed in the uplink, multiple ACK/NACK feedback over different PUCCH for all PDSCH transmissions over all active DL carriers can be sent simultaneously over different orthogonal resources within different or the same UL carrier(s) depending on the DL/UL carrier mapping (one DL to one UL, or multiple DLs to one UL). A rule for the single component carrier case can be applied to determine whether SORTD or single antenna mode should be adopted to send each ACK/NACK feedback for the PDSCH transmission over each DL carrier.

Figure 14A:
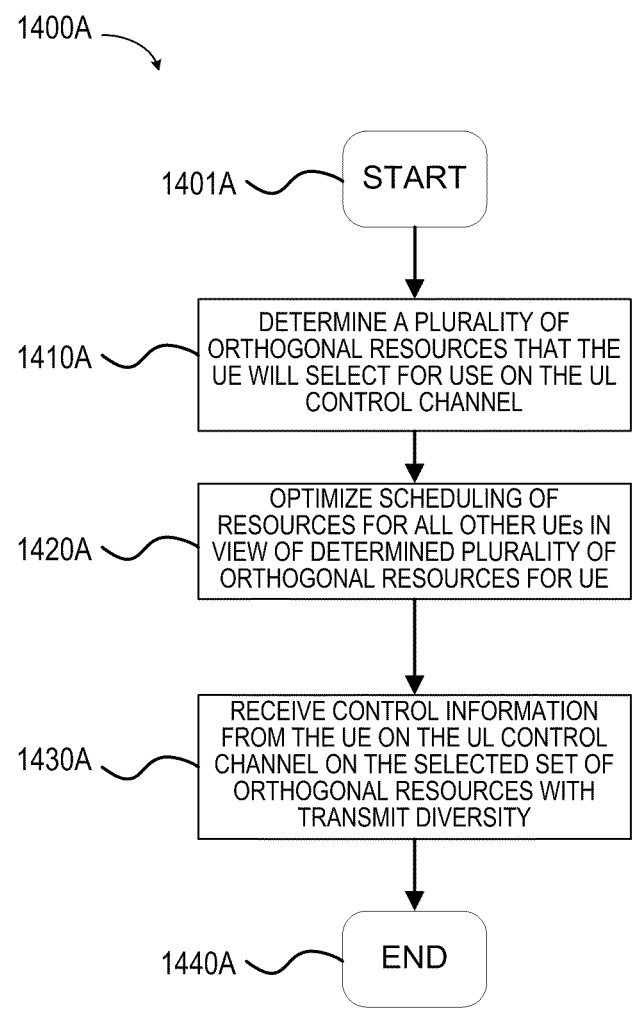
FIG. 14A is a flowchart illustrating an exemplary process for SORTD ACK/NACK feedback for multiple component DL carriers in FDD operation from a perspective of an eNB.

FIG. 14A is a flowchart illustrating an exemplary process 1400A for SORTD ACK/NACK feedback for multiple component carriers in FDD operation from a perspective of an eNB. For ease of illustration without any intent to limit the scope of the present disclosure in any way, the process 1400A will be described with reference to FIG. 1. In this embodiment for SORTD mode, it is assumed that the eNB has already received control information from the UE 110 on an UL control channel which indicates that the UE 110 has multiple antennas 124, e.g., for MIMO operation. For example, the eNB 102 may have already received such an indication from the UE 110 at the time the UE 110 enters the network or the cell of the eNB 102. The process 1400A begins at start state 1401A and proceeds to operation 1410A in which the eNB 102 determines, by a pre-established algorithm, a plurality of orthogonal resources that the UE 110 will select for use by the UE 110 on the UL control channel. In this regard, the UE 110 will be selecting the plurality of orthogonal resources according to the pre-established algorithm. Some exemplary resource selection rules/algorithms are described below with respect to FIGS. 15 and 17.

The process 1400A proceeds to operation 1420A in which the eNB 102 and/or the eNB scheduler 104 optimizes the scheduling of resources for use by all other UEs being serviced by eNB 102, taking into account the determined plurality of orthogonal resources that the UE 110 will select for use by the UE 110 on the UL control channel.

The process 1400A proceeds to operation 1430A in which the eNB 102 receives control information from the UE 110, such as ACK/NACK feedback or other control information, on the UL control channel on the selected plurality of orthogonal resources with transmit diversity. The process 1400A terminates at end state 1440A.

Figure 14B:
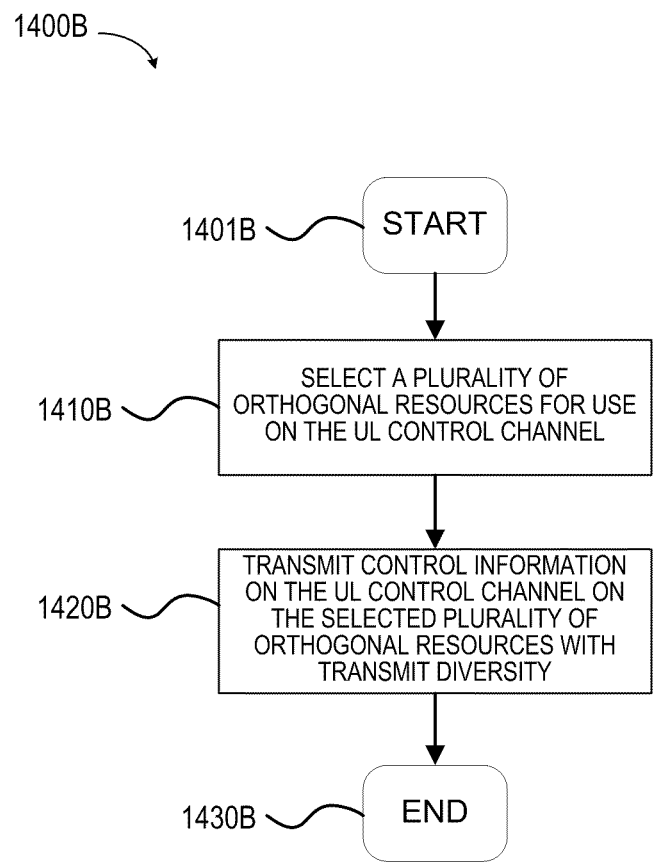
FIG. 14B is a flowchart illustrating an exemplary process for SORTD ACK/NACK feedback for multiple component DL carriers in FDD operation from a perspective of a UE.

FIG. 14B is a flowchart illustrating an exemplary process 1400B for SORTD ACK/NACK feedback for multiple component carriers in FDD operation from a perspective of a UE. The process 1400B begins at start state 1401B and proceeds to operation 1410B in which the UE 110 selects, by a pre-established algorithm, a plurality of orthogonal resources that the UE 110 will use for the UL control channel.

The process 1400B proceeds to operation 1420B in which the UE 110 transmits control information, such as ACK/NACK feedback or other control information, on the UL control channel on the selected plurality of orthogonal resources, with transmit diversity.

The process 1400B then proceeds to terminate at end state 1430B.

1. Multiple DL Component Carriers: One-to-One Mapping Configuration

Where DL data (e.g., PDSCH) transmission occurs over multiple DL carriers, only one DL carrier is associated with each UL carrier in a one-to-one mapping configuration. By way of example, a PDSCH over DL carrier k is scheduled by PDCCH over DL carrier k and ACK/NACK for a PDSCH transmission over DL carrier k is sent over PUCCH in UL carrier k.

Figure 15:
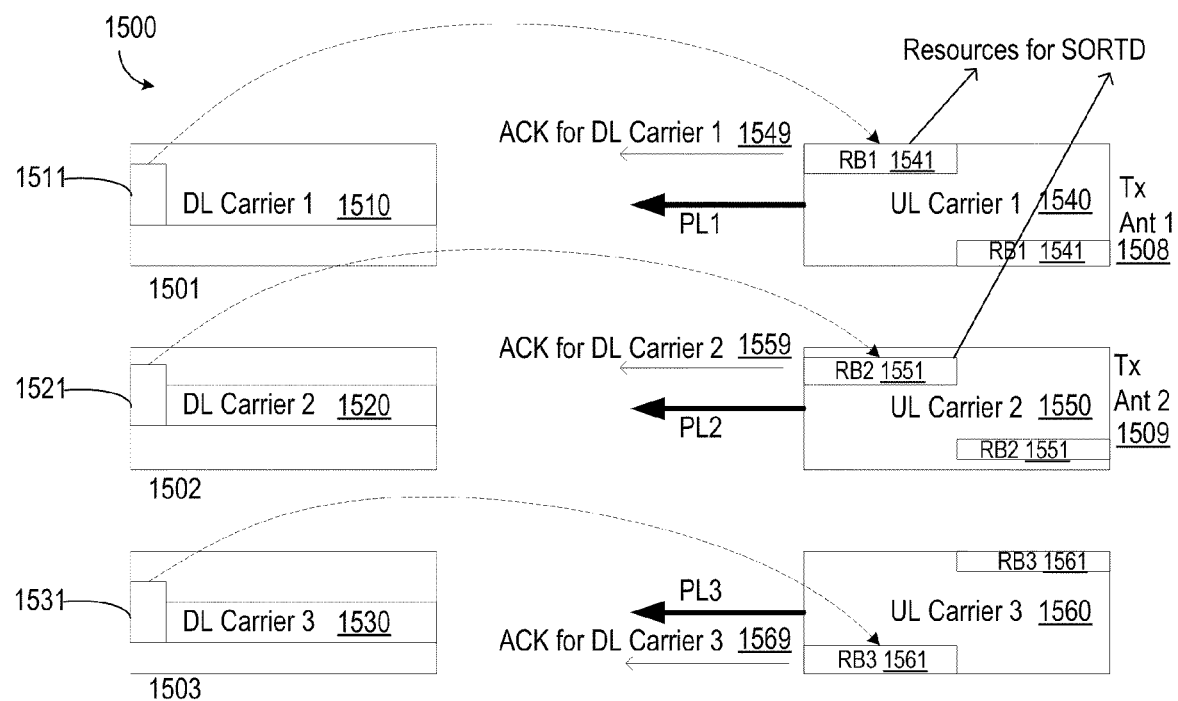
FIG. 15 is a diagram illustrating SORTD ACK/NACK feedback for multiple component DL carriers in a one-to-one mapping configuration in FDD operation.

FIG. 15 is a diagram 1500 illustrating one-to-one (DL/UL) mapping configuration for SORTD ACK/NACK feedback for multiple DL component carriers in FDD operation. DL transmissions 1501, 1502, 1503 are made from an eNB to a UE over DL carriers 1510, 1520, 1530 along with Downlink Control Information (DCI) in CCEs 1511, 1521, 1531, respectively. In this scenario, ACK/NACK messages 1549, 1559, 1569 corresponding to the DL transmissions 1501, 1502, 1503 are transmitted from the UE to the eNB in an UL control channel (e.g., PUCCH) over three corresponding UL carriers 1540, 1550, 1560. Each of the three UL carriers 1540, 1550, 1560 includes a corresponding available resource block, namely, RB1 1541, RB2 1551 and RB3 1561. In the example of FIG. 15, resource blocks RB1 1541, RB2 1551 and RB3 1561 are mirror-hopped across the two time slots within each of UL carriers 1540, 1550, 1560, respectively. In the illustrated example, two resources, namely, RB1 1541 and RB2 1551 in the UL carriers 1540 and 1550, respectively, are selected among the three available resources RB1 1541, RB2 1551 and RB3 1561 based on relative amounts of UL path losses (PL1, PL2, PL3) of each of corresponding UL Carrier 1 1540, UL Carrier 2 1550 and UL Carrier 3 1560. In the illustrated example, RB3 1561 is not chosen because path loss PL3 is greater than that of PL1 and PL2. The ACK message 1549 for DL carrier 1 is transmitted on RB1 1541 while the ACK message 1559 for DL carrier 2 is transmitted on RB2 1551. The ACK message 1569 for DL carrier 3 is bundled for transmission in either RB1 1541 or RB2 1551. This way, bundled ACK/NACK messages are sent over strongest carriers.

A further exemplary resource selection rule for SORTD FDD/ACK in one-to-one configuration is now described. Assume that a UE decides to employ a transmission scheme that requires M resources. The M resources can be selected to reside in a set of UL carriers that have the least uplink (UL) path loss. This rule can be also applied to UEs configured in single antenna port mode. For example, let {PL1, PL2, PL3} be the reverse link (UL) path loss of each of 3 active DL carriers with PDSCH transmission occurring in ascending order, {k1, k2, k3} be the corresponding active DL carrier index. Furthermore, let Resource_q denote a set of available resources for ACK/NACK feedback in UL carrier q, where q lies in {k1, k2, k3}. Then, the required M resources can be selected by taking resources from the set of available resources Resource_q in the following order until obtaining all M resources: Resource_k1→Resource_k2→Resource_k3 (in order of the least path loss).

When SC-FDM (Single Carrier Coding Frequency Division Multiplex) is required, ACK bundling across carriers or ACK multiplexing similar to Rel-8 TDD operation described above with respect to FIG. 10 can be adopted. For ACK bundling: let {PL1, PL2, ... } be the UL path loss for each active DL carrier (e.g., for transmitting a PDSCH) in ascending order, and {k1, k2, ... } be the corresponding active DL carrier index. If the number of CCEs in the DCI for the PDSCH over carrier k1 is greater than 1, SORTD is applied over two orthogonal resources linked with two CCEs occupied by the DCI on carrier k1.

If only 1 CCE is used for the DCI over carrier k1 and approaches discussed above with respect to FIGS. 12A and 12B for a single component carrier configuration are allowed, then SORTD can be applied over two resources over carrier k1. Otherwise, if a difference between PL2 and PL1 is less than a threshold PL (PL2−PL1<PL_Thr), SORTD can be applied over two orthogonal resources: one from carrier k1 linked with the first CCE in the DCI on carrier k1, and the other from carrier k2 linked with the first CCE in the DCI on carrier k2. In one embodiment, PL_Thr is a high layer configured parameter. Otherwise, if PL2−PL1≥PL_Thr, a single antenna port mode is applied and PUCCH is sent from carrier k1.

When SC-FDM is required, ACK/NACK multiplexing with channel selection can be employed. In this approach, it is assumed that PUCCH is to be sent over carrier kj after channel selection has been done. Then over DL carrier kj the rule for "single component carrier" mode as described above can be applied to determine whether SORTD is applied or not.

Figure 16A:
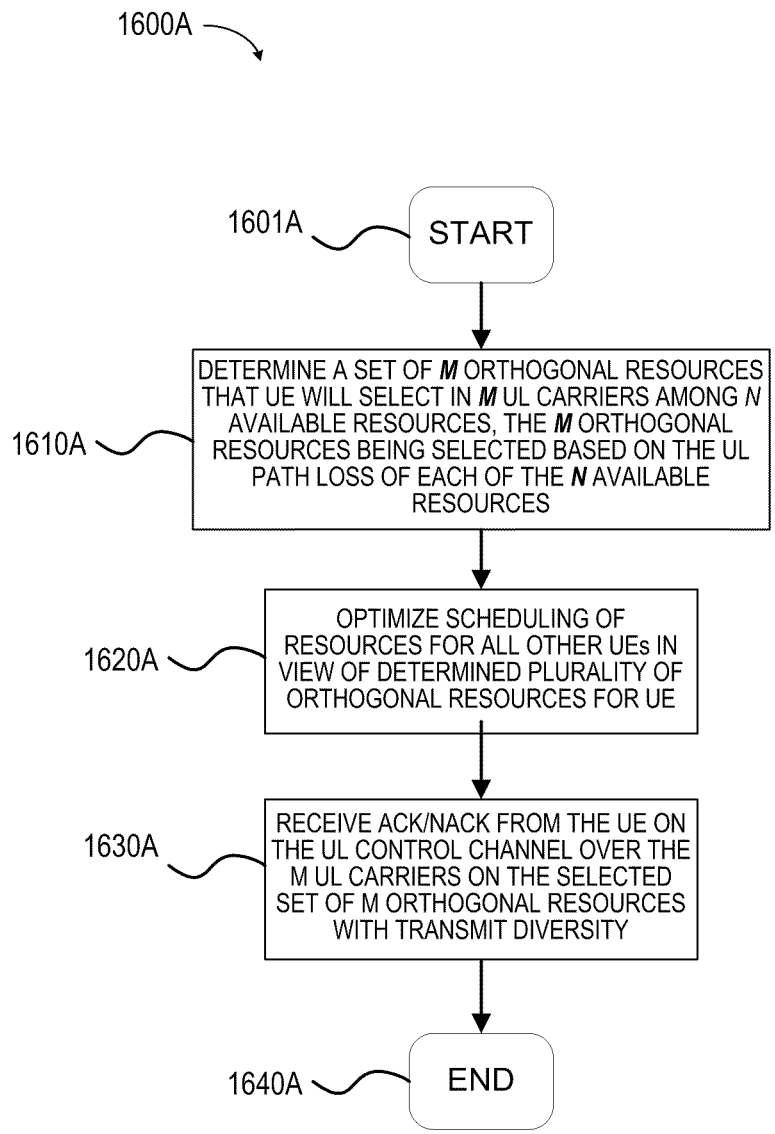
FIG. 16A is a flowchart illustrating an exemplary process for SORTD ACK/NACK feedback for multiple component DL carriers in a one-to-one mapping configuration in FDD operation from a perspective of an eNB.

FIG. 16A is a flowchart illustrating an exemplary process 1600A for SORTD ACK/NACK feedback for multiple DL component carriers in one-to-one (DL/UL) mapping configuration in FDD operation from a perspective of an eNB. For ease of illustration without any intent to limit the scope of the present disclosure in any way, the process 1600A will be described with reference to FIG. 1.

The process 1600A begins at start state 1601A and proceeds to operation 1610A in which the eNB 102 and/or the eNB scheduler 104 determines a set of M orthogonal resources in M UL carriers among N available resources, the set of M orthogonal resources being the resources that will be selected by the UE 110 using the same algorithm. In the illustrated example of FIG. 15, N=3, and M=2, and the resource selection is based on an UL path loss associated with each of the three active UL carriers 1540, 1550, 1560.

The process 1600A proceeds to operation 1620A in which the eNB 102 and/or the eNB scheduler 104 optimizes the scheduling of resources for use by all other UEs being serviced by eNB 102, taking into account the determined set of M orthogonal resources that the UE 110 will select for use by the UE 110 on the UL control channel.

The process 1600A proceeds to operation 1630A in which the eNB 102 receives ACK/NACK feedback from UE 110 on a UL control channel (e.g., PUCCH) over the M UL carriers on the selected set of M orthogonal resources with transmit diversity. The process 1600A terminates at end state 1640A.

Figure 16B:
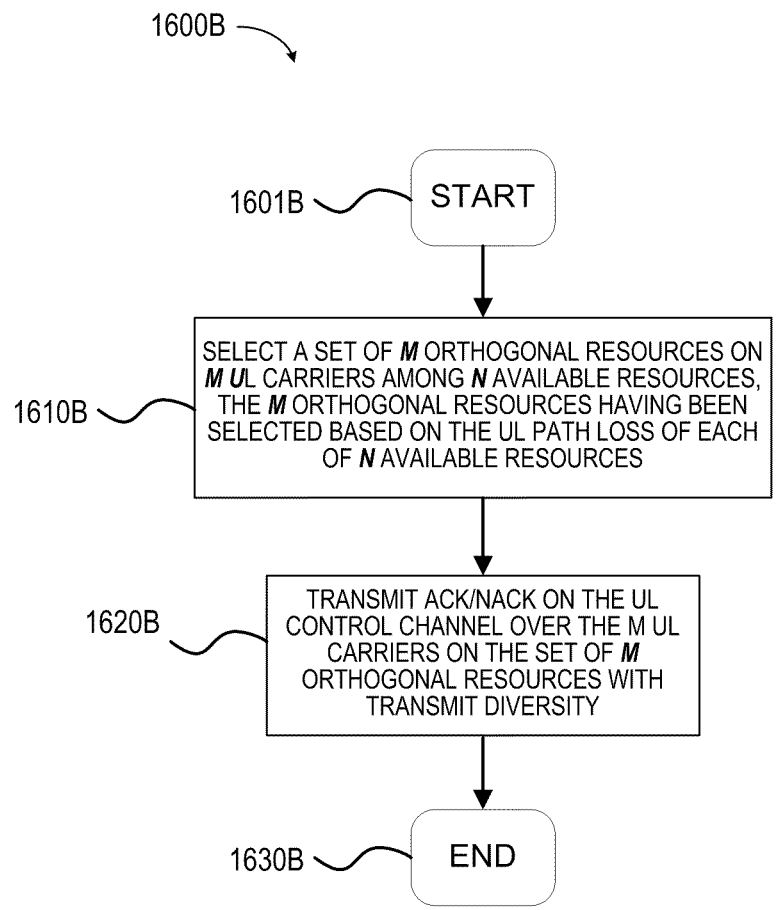
FIG. 16B is a flowchart illustrating an exemplary process for SORTD ACK/NACK feedback for multiple component DL carriers in a one-to-one mapping configuration in FDD operation from a perspective of a UE.

FIG. 16B is a flowchart illustrating an exemplary process 1600B for SORTD ACK/NACK feedback in one-to-one (DL/UL) mapping configuration in FDD operation from a perspective of a UE. The process 1600B begins at start state 1601B and proceeds to operation 1610B in which the UE 110 selects a set of M orthogonal resources for use on the UL control channel over M UL carriers, the M orthogonal carriers being selected based on the respective UL path loss associated with each of a plurality of N available resources in all active UL carriers. The process 1600B proceeds to operation 1620B in which the UE 110 transmits ACK/NACK on the UL control channel on the set of M orthogonal resources with transmit diversity. The process 1600B terminates at end state 1630B.

2. Many-to-One Mapping Configuration

Where DL data transmission occurs over multiple DL carriers, one UL carrier can be associated with the multiple DL carriers in a many-to-one mapping configuration. Such a many-to-one mapping configurations can be utilized when an asymmetric DL/UL configuration exists or when a cross-carrier control operation is performed. In the many-to-one mapping configuration, ACK/NACK feedback for PDSCH transmissions over multiple DL carriers is sent over a single UL carrier.

Figure 17:
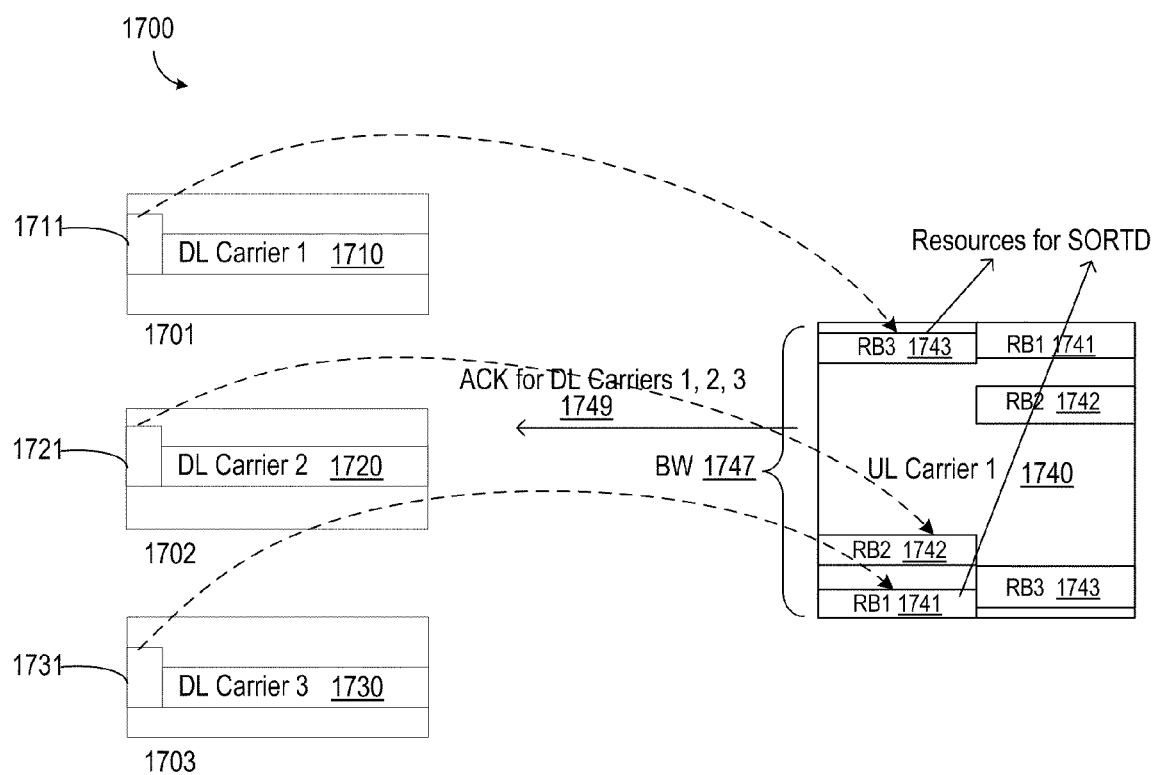
FIG. 17 is a diagram illustrating SORTD ACK/NACK feedback for multiple component DL carriers in a many-to-one mapping configuration in FDD operation.

FIG. 17 is a diagram 1700 illustrating a many-to-one (DL/UL) mapping configuration for SORTD ACK/NACK feedback in multiple DL component carriers in FDD operation. DL data transmissions 1701, 1702 and 1703 are made from an eNB to a UE over DL carriers 1710, 1720 and 1730 along with Downlink Control Information (DCIs) on CCEs 1711, 1721 and 1731, respectively. In response, ACK messages 1749 corresponding to the DL data transmissions 1701, 1702, 1703 are transmitted from the UE to the eNB in an UL control channel (e.g., PUCCH) over a single UL carrier 1740. The single UL carrier 1740 includes three available resources, namely, RB1 1741, RB2 1742, and RB3 1743. As seen in FIG. 17, resources RB1 1741, RB2 1742, and RB3 1743 are mirror-hopped across the two slots of UL carrier 1740 (slot-boundary frequency hopping). In the illustrated example, two resources, namely, RB1 1741 and RB3 1743 of the single UL carrier 1740 are selected among the three available resources based on proximity of each of the available resources to edges of the bandwidth 1747 of the single UL carrier 1740. Each of the selected resources RB1 1741 and RB3 1743 is closest to a lower and upper edge, respectively, of the bandwidth in comparison to the remaining (unselected) RB2 1742. This way, bundled ACK/NACK messages are sent over edge RBs, and a potential fragmentation problem during scheduling of resource blocks for uplink data in UL carrier 1740 can be avoided or minimized.

An exemplary resource selection rule for SORTD FDD/ACK feedback in a many-to-one (DL/UL) configuration is now further described. Assume that a UE decides to employ a transmission scheme that requires M resources. The M resources can be chosen so that the mapped PUCCH resources reside in the physical RBs closest to one or both edges of the bandwidth of the single UL carrier over which the ACK/NACK feedback is made. This rule can be also applied to UEs configured in a single antenna port mode.

When a single carrier frequency division multiplexing (SC-FDM) waveform is to be preserved, ACK bundling across carriers or ACK multiplexing with channel selection similar to Rel-8 TDD operation described above with respect to FIG. 10 can be used. For example, let $\{n\_cce1\_1, n\_cce2\_1, n\_cce3\_1 \ldots\}$ be the set of indices of the first CCEs in the DCIs for the PDSCH transmission over the active DL carriers and let $\{k1, k2, \ldots\}$ denote the corresponding set of DL active carriers.

For ACK bundling in the SC-FDM scenario, SORTD is applied over two orthogonal resources selected from the following union of sets:

{Resources available for

ACK/NACK feedback to PDSCH over carrier $k1$} +

{Resources available for ACK/NACK feedback to PDSCH over carrier $k2$} + ... {Resources available for ACK/NACK feedback to PDSCH over carrier $k_L$}, where L is a total number of active carriers. In addition, two resources can be selected among all of the available resources so that the resulting linked PUCCH resources are mapped to the lowest physical Resource Block index.

For ACK multiplexing with channel selection in the SC-FDM scenario, assume that the channel selection over resources linked with CCEs: $\{n\_cce1\_1, n\_cce2\_1, \ldots\}$ has been done and the resource linked with the CCE corresponding to $n\_ccej\_1$ (first CCE occupied by the DCI for PDSCH over DL carrier kj) is selected for PUCCH transmission. When the DCI for PDSCH over DL carrier kj occupies multiple CCEs, SORTD is applied over resources linked with a first CCE having an index of $n\_ccej\_1$ and a second CCE having an index of $n\_ccej\__1+1$ in the DCI for PDSCH over DL carrier kj. Otherwise, a single antenna port mode is applied (unless approaches similar to those described above with respect to FIGS. 12A and 13B for the single component carrier operation are adopted).

Figure 18A:
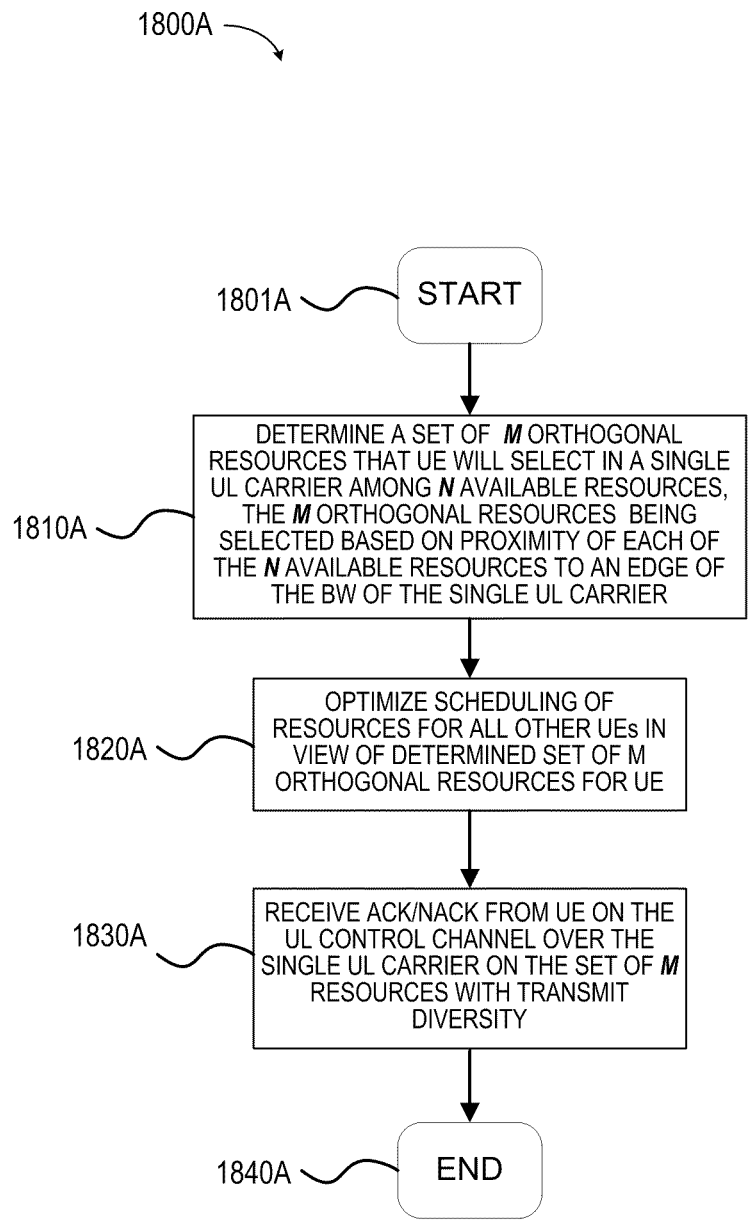
FIG. 18A is a flowchart illustrating an exemplary process for SORTD ACK/NACK feedback for multiple component DL carriers in a many-to-one mapping configuration in FDD operation from a perspective of an eNB.

FIG. 18A is a flowchart illustrating an exemplary process 1800A for SORTD ACK/NACK feedback in a many-to-one (DL/UL) mapping configuration in FDD operation from a perspective of an eNB. For ease of illustration without any intent to limit the scope of the present disclosure in any way, the process 1800A will be described with reference to FIG. 1.

The process 1800A proceeds to operation 1810A in which the eNB 102 and/or the eNB scheduler 104 determines a set of M orthogonal resources that the UE will select in a single UL carrier among N available resources where the resource selection is based on proximity of each of the N available resources to an edge of the bandwidth of the single UL carrier. In the illustrated example of FIG. 17, N=3, M=2, and the resource selection is based on proximity of each of the available resources to an edge of the bandwidth 1747 of the single UL carrier 1740.

The process 1800A proceeds to operation 1820A in which the eNB 102 and/or the eNB scheduler 104 optimizes the scheduling of resources for use by all other UEs being serviced by eNB 102, taking into account the determined set of M orthogonal resources that the UE 110 will select for use by the UE 110 on the UL control channel. The process 1800A proceeds to operation 1830A in which the eNB 102 receives ACK/NACK feedback on the single UL control channel (e.g., PUCCH) over a single UL carrier on the selected set of M orthogonal resources with transmit diversity. The process 1800A terminates at end state 1840A.

Figure 18B:
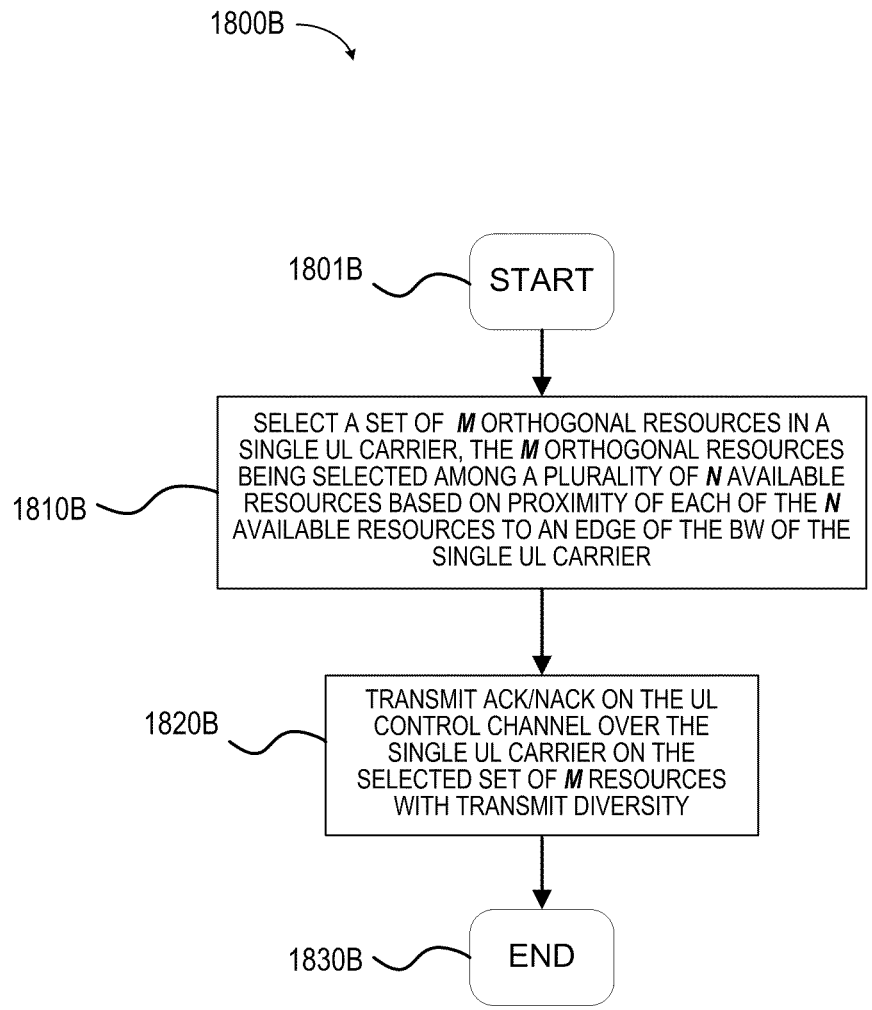
FIG. 18B is a flowchart illustrating an exemplary process for SORTD ACK/NACK feedback for multiple component DL carriers in a many-to-one mapping configuration in FDD operation from a perspective of a UE.

FIG. 18B is a flowchart illustrating an exemplary process 1800B for ACK/NACK feedback in a many-to-one (DL/UL) mapping configuration in FDD operation from a perspective of a UE. For ease of illustration without any intent to limit the scope of the present disclosure in any way, the process 1800B will be described again with reference to FIG. 1.

The process 1800B proceeds to operation 1810B in which the UE 110 selects a set of M orthogonal resources for use by UE 110 on the UL control channel, wherein the M orthogonal carriers are selected based on proximity of each of available resources to an edge of the bandwidth of the single UL carrier. The process 1800B proceeds to operation 1820B in which the UE 110 transmits ACK/NACK control information on the UL control channel over the single UL carrier on the set of M orthogonal resources with transmit diversity. The process 1800B terminates at end state 1830B.

III. SORTD for TDD: ACK/NACK

Various exemplary embodiments of UL control channel resource allocations for SORTD ACK/NACK feedback for LTE operating in time division duplex (TDD) operation are now described. In TDD operation, Downlink Control Information (DCI) including resource allocation and other control information for a UE can be transmitted on a DL data channel (e.g., PDSCH along with data) using one or more control channel elements (CCEs) in multiple DL subframes.

Figure 19:
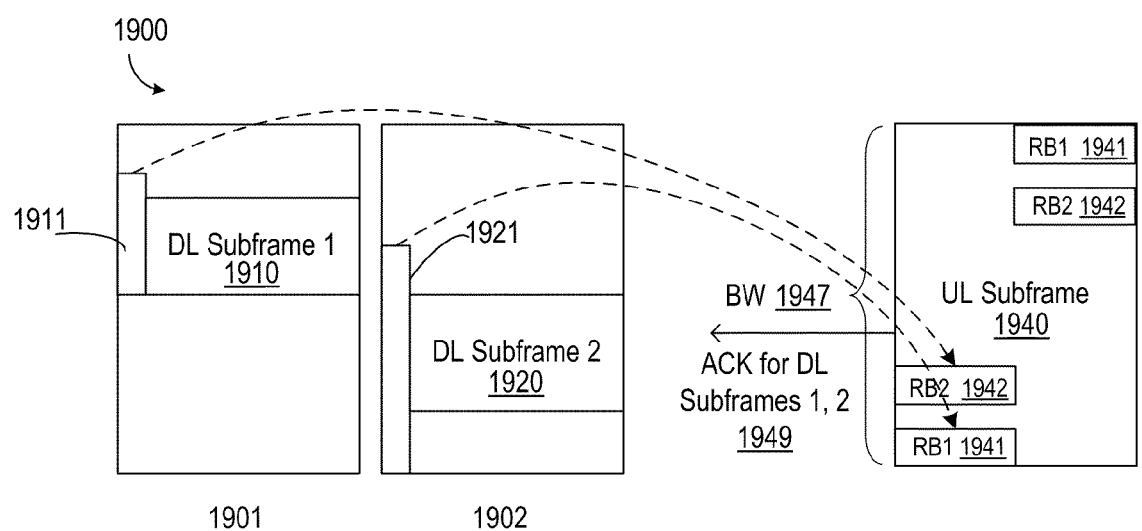
FIG. 19 is a diagram illustrating SORTD ACK/NACK feedback for multiple DL subframes in TDD operation.

In FIG. 19, a diagram 1900 is provided for SORTD ACK/NACK feedback associated with downlink (DL) data transmissions over multiple DL subframes in TDD operation. DL data transmissions 1901, 1902 are made from an eNB to a UE over DL subframes 1910, 1920 along with Downlink Control Information (DCI) in CCEs 1911 and 1921, respectively. In response, ACK messages 1949 corresponding to the DL data transmissions 1901, 1902 over the DL subframes 1910, 1920 are transmitted from the UE to the eNB in an UL control channel (e.g., PUCCH) over a single UL subframe 1940. The single UL subframe 1940 includes available resources, among which are RB1 1941 and RB2 1942, which are shown in FIG. 19 as being mirror-hopped across both slots of UL subframe 1940. In the illustrated example, the two resources, RB1 1941 and RB2 1942, are selected based on proximity of each of the available resources to the edges of the bandwidth 1947 associated with the single UL subframe 1940. The selected set of resources RB1 1941 and RB2 1942 is closest to edges of the bandwidth 1947 in comparison to other resources. This way, bundled ACK/NACK messages are sent over near-edge RBs, and a potential fragmentation problem when scheduling resources for uplink data can be avoided or minimized.

An exemplary resource selection rule for SORTD ACK/NACK for TDD operation is now described. Assume that the UE decides to employ a transmission scheme that requires M resources. The M resources can be chosen so that the mapped PUCCH resources reside in the physical RBs closest to the edges of the bandwidth. This rule can be also applied to UEs configured in a single antenna port mode.

When N×SC-FDM is allowed, multiple ACK/NACK feedback corresponding to those detected PDCCH in subframes $\{n-q\_0, n-q\_1, \ldots\}$, where $\{q\_0, q\_1, \ldots\}$ is a subset of $\{k\_0, \ldots, k\_M-1\}$, which is the corresponding DL association set, can be sent simultaneously over different PUCCH resources. For each detected PDCCH in subframe n-q_j, the following rule can be applied:

If the number of CCEs occupied by the corresponding DCI is only 1, single antenna port mode operation is applied (unless approaches similar to those described above with respect to FIGS. 12A and 12B for the single component carrier operation are adopted); and If the number of CCEs occupied by the corresponding DCI is greater or equal to 2 and $\{n\_ccej, n\_ccej+1, \ldots\}$ denotes the set of CCEs, SORTD is then applied over PUCCH resources linked with CCE: n_ccej and CCE: n_ccej+1 in subframe n-q_j.

When a single carrier frequency division multiplexing (SC-FDM) waveform is to be preserved, ACK bundling across carriers or ACK multiplexing with channel selection similar to Rel-8 TDD operation described above with respect to FIG. 10 can be used. For ACK bundling in such a situation, if multiple CCEs are occupied by the DCIs for the PDSCH transmission in subframes $\{n-q\_0, n-q\_1, \ldots\}$ where $\{q\_0, q\_1, \ldots\}$ is a subset of $\{k\_0, \ldots, k\_M-1\}$, which is the corresponding DL association set, SORTD can be applied over two orthogonal resources linked with two CCEs in the set of all occupied CCEs comprising: {CCEs in the DCI for PDSCH in subframe $n-q\_0$}+{CCEs in the DCI for PDSCH over in subframe $n-q\_{-1}$}+ . . . etc. The two selected CCEs can be selected so that the resulting linked PUCCH resources are mapped to the physical RBs that are closest to the edges of the UL bandwidth. Otherwise, single antenna port mode is applied to send the bundled ACK/NACK unless similar approaches as those described above with respect to FIG. 12A and FIG. 12B for FDD "Single Component Carrier" mode are adopted for use.

For ACK multiplexing with channel selection, it is assumed that channel selection over $\{n\_cce1, n\_cce2, \ldots\}$ has been done, where n_ccej denotes the first CCE index in the DCI for PDSCH in subframe n-q_j, and so the resource linked with CCE: n_ccej in subframe n-q_j is selected for PUCCH transmission. When the DCI for PDSCH in subframe n-q_j occupies multiple CCEs, SORTD is applied over resources linked with CCE: n_ccej and with CCE: n_ccej+1 in DL subframe n-q_j. Otherwise, single antenna port mode is applied, unless similar approaches as those described above with respect to FIG. 12A and FIG. 12B for FDD "Single Component Carrier" mode are adopted for use.

Figure 20A:
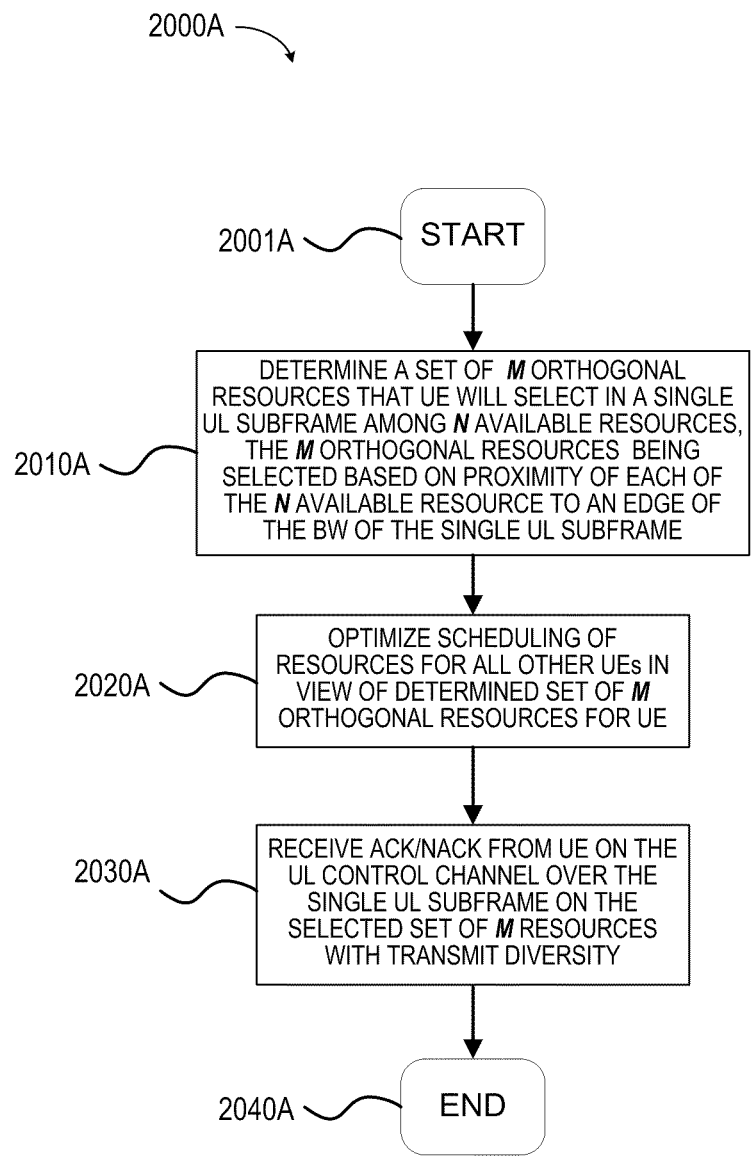
FIG. 20A is a flowchart illustrating an exemplary process for SORTD ACK/NACK feedback for multiple DL subframes in TDD operation from a perspective of an eNB.

FIG. 20A is a flowchart illustrating an exemplary process 2000A for SORTD ACK/NACK feedback in TDD operation from a perspective of an eNB. For ease of illustration without any intent to limit the scope of the present disclosure in any way, the process 2000A will be described with reference to FIG. 1.

The process 2000A proceeds to operation 2010A in which the eNB 102 and/or the eNB scheduler 104 determines a set of M orthogonal resources that the UE will select in a single UL subframe among N available resources distributed in the single UL subframe, in which the resource selection is based on proximity of each of the N available resources to an edge of the bandwidth of the single UL subframe. In the illustrated example of FIG. 19, N=2, M=2, and the resource selection is based on proximity of the available resources to an edge of the bandwidth 1947 associated with the single UL subframe 1940. In the example shown in FIG. 19, the resources RB1 1941 and RB2 1942 are selected.

The process 2000A proceeds to operation 2020A in which the eNB 102 and/or the eNB scheduler 104 optimizes the scheduling of resources for use by all other UEs being serviced by eNB 102, taking into account the determined set of M orthogonal resources that the UE 110 will select for use by the UE 110 on the UL control channel.

The process 2000A proceeds to operation 2030A in which the eNB 102 receives ACK/NACK feedback from UE 110 on the single UL control channel (e.g., PUCCH) over a single UL subframe on the selected set of M orthogonal resources with transmit diversity. The process 2000A terminates at end state 2040A.

Figure 20B:
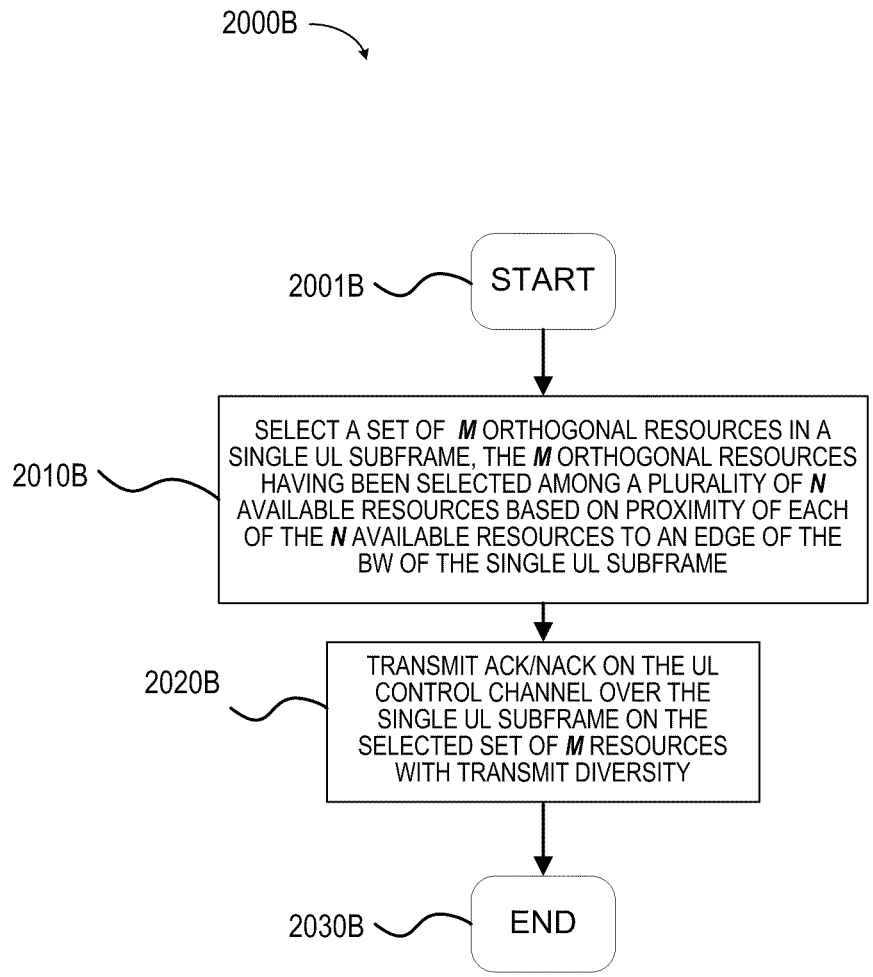
FIG. 20B is a flowchart illustrating an exemplary process for SORTD ACK/NACK feedback for multiple DL subframes in TDD operation from a perspective of a UE.

FIG. 20B is a flowchart illustrating an exemplary process 2000B for SORTD ACK/NACK feedback in TDD operation from a perspective of a UE. The process 2000B begins at start state 2001B and proceeds to operation 2010B in which the UE 110 selects a set of M orthogonal resources for use by UE 110 on the UL control channel, wherein the M orthogonal carriers are selected based on the proximity of each of the available resources to an edge of the bandwidth associated with the single UL subframe to be used by UE 110 for ACK/NACK feedback. The process 2000B proceeds to operation 2020B in which the UE 110 transmits ACK/NACK on the UL control channel over the single UL subframe on the set of M orthogonal resources with transmit diversity. The process 2000B terminates at end state 2030B.

IV. SPS ACK/NACK, SR, CQI

Various SORTD UL control channel (e.g., PUCCH) resource allocation schemes for semi-persistent scheduling (SPS) ACK/NACK, scheduling request (SR), and channel quality indicator (CQI) are now described.

A. SPS ACK/NACK

While dynamic scheduling is advantageous for bursty, infrequent and bandwidth consuming data transmissions (e.g. web surfing, video streaming, emails) it is less suited for real time streaming applications such as voice calls. Here, data is sent in short bursts while at regular intervals. If the data rate of the stream is very low, as is the case for voice calls, the overhead of the scheduling messages is very high because little data is sent for each scheduling message.

Semi-persistent scheduling (SPS) can be used in such low data-rate streaming cases. Instead of dynamically scheduling each uplink or downlink transmission, a semi-persistent transmission pattern is defined. This significantly reduces the scheduling assignment overhead in the control channel.

During silence periods, wireless voice codecs stop transmitting voice data and only send silence description information with much longer time intervals in between. During those silence times the SPS can be switched-off. In the uplink, the SPS is implicitly canceled if no data is sent for a network configured number of empty uplink transmission opportunities. In downlink direction, the SPS can be canceled with a radio recess control (RRC) message. The network can determine when and for which packets to use the SPS based on QCI and dedicated bearers.

Exemplary PUCCH resource scheduling schemes for SPS ACK/NACK are now described. For Rel-8 UE, a set of available PUCCH resources are configured by higher layers, and a TPC command in SPS activation is used to indicate a specific PUCCH resource to be used for ACK/NACK feedback. For LTE-A UE when configured in a SORTD mode, a higher layer can configure/reserve more PUCCH resources so that the LTE-A UE can employ SORTD during ACK/NACK transmission. One value carried by the TPC command can be mapped to two orthogonal resources in the set of total available PUCCH resources configured for SRS ACK/NACK feedback. For example, a two-bit value in the TPC command can indicate one of four predetermined combinations of two orthogonal resources.

Figure 21A:
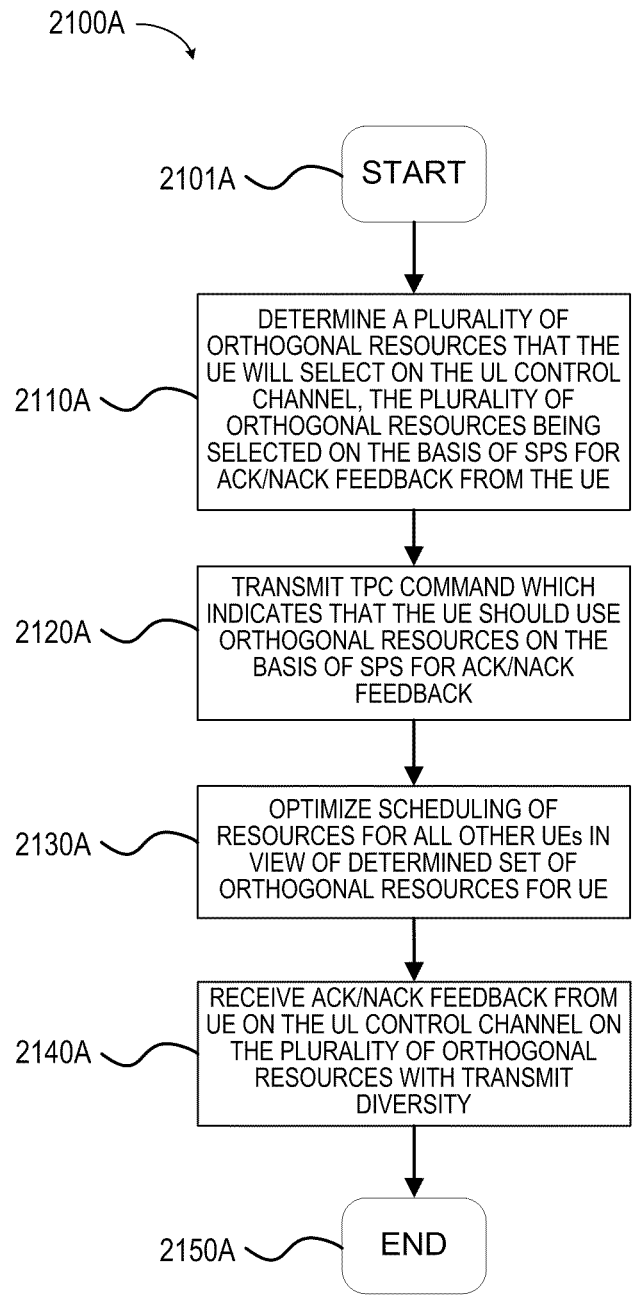
FIG. 21A is a flowchart illustrating an exemplary process for SORTD SPS ACK/NACK feedback from a perspective of an eNB.

FIG. 21A is a flowchart illustrating an exemplary process 2100A for SORTD SPS ACK/NACK feedback from a perspective of an eNB. For ease of illustration without any intent to limit the scope of the present disclosure in any way, the process 2100A will be described with reference to FIG. 1. The process 2100A begins at start state 2101A and proceeds to operation 2110A in which the eNB 102 and/or the eNB scheduler 104 determines a semi-persistent plurality of orthogonal resources that the UE 110 will select for use on the UL control channel, wherein the plurality of orthogonal resources are scheduled on the basis of SPS for ACK/NACK feedback from the UE.

The process 2100A proceeds to operation 2120A in which the eNB 102 transmits an indication that the UE 110 should select a plurality of orthogonal resources on the basis of SPS for ACK/NACK feedback from UE 110. In certain embodiments, the operation 2120A involves sending a transmit power correction command (TPC) to the UE 110 where the TPC includes a value corresponding to an SPS plurality of orthogonal resources. The process 2100A proceeds to operation 2130A in which the eNB 102 and/or the eNB scheduler 104 optimizes the scheduling of resources for use by all other UEs being serviced by eNB 102, taking into account the determined set of semi-persistent plurality of orthogonal resources that the UE 110 will select for use by the UE 110 on the UL control channel. The process 2100A proceeds to operation 2140A in which the eNB 102 receives ACK/NACK on the UL control channel on the SPS plurality of orthogonal resources with transmit diversity. The process 2100A terminates at end state 2150A.

Figure 21B:
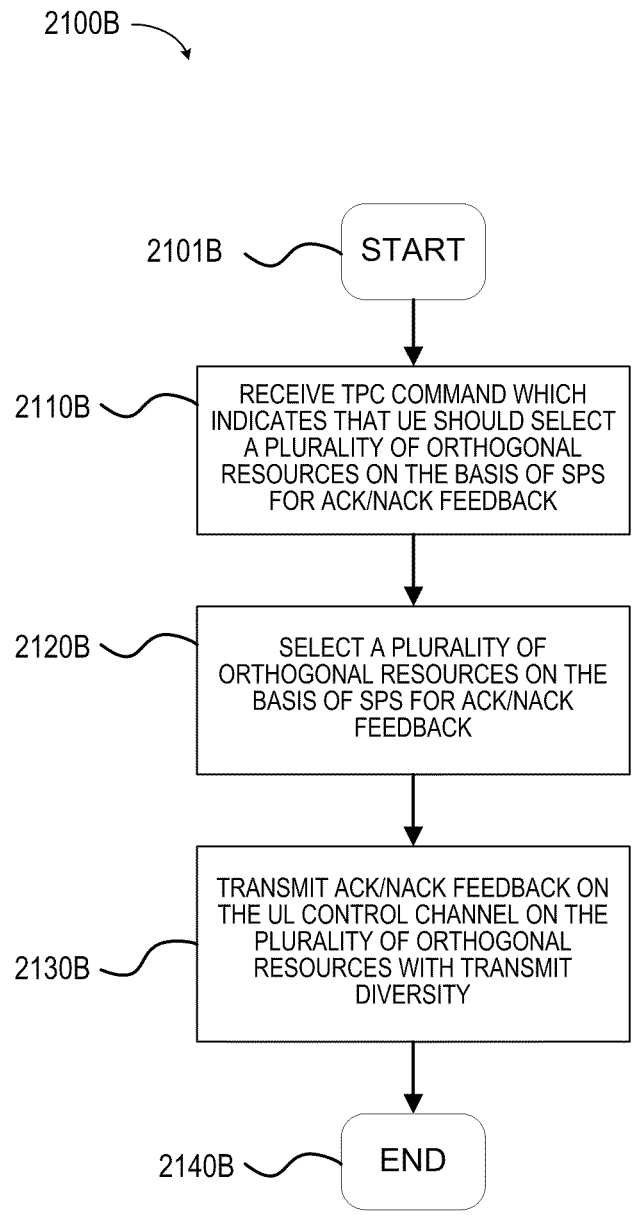
FIG. 21B is a flowchart illustrating an exemplary process for SORTD SPS ACK/NACK feedback from a perspective of a UE.

FIG. 21B is a flowchart illustrating an exemplary process 2100B for an uplink (UL) control channel resource allocation for SORTD SPS ACK/NACK mode from a perspective of a user equipment (UE).

The process 2100B proceeds to operation 2110B in which the UE 110 receives an indication that UE 110 should select a SPS plurality of orthogonal resources for ACK/NACK feedback. As described above with respect to FIG. 21A, the indication can be in the form of a transmit power correction command (TPC) that includes a value corresponding to an SPS plurality of orthogonal resources. The process 2100B proceeds to operation 2120B in which the UE 110 selects a SPS plurality of orthogonal resources for ACK/NACK feedback. The process 2100B proceeds to operation 2130B in which the UE 110 transmits ACK/NACK on the UL control channel on the SPS plurality of orthogonal resources with transmit diversity. The process 2100B terminates at end state 2140B.

B. Scheduling Request (SR)

Figure 22A:
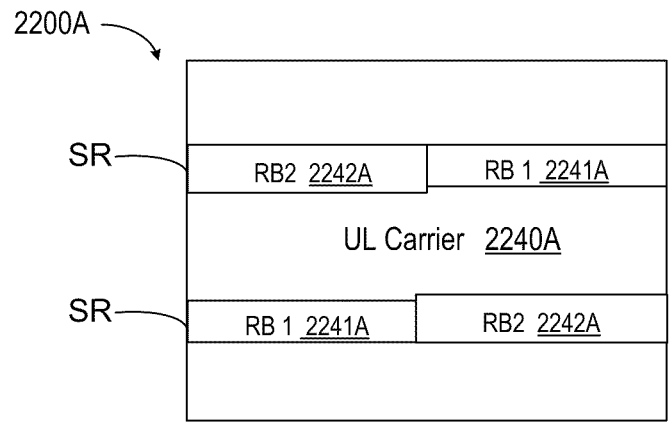
FIG. 22A is a diagram depicting an UL carrier that includes a plurality of orthogonal resources configured for a scheduling request (SR).

SORTD UL control channel resource allocation schemes for scheduling request (SR) are now described. As described above with respect to FIG. 11A, in a SORTD mode, the eNB 102 and/or the eNB scheduler 104 schedules a plurality of orthogonal resources for the UE 110 on a UL control channel (e.g., PUCCH). In certain embodiments, the plurality of orthogonal resources are scheduled for a scheduling request (SR) from the UE. FIG. 22A is a diagram 2200A depicting an UL carrier 2240A that includes a first resource (RB1) 2241A and a second resource (RB2) 2242A that are scheduled for use by UE 110 for a scheduling request (SR). When a LTE-A UE is configured in SORTD for SR, a higher layer configures the two resources 2241A, 2242A for the UE, and the UE sends the SR over the two resources via SORTD.

Figure 22B:
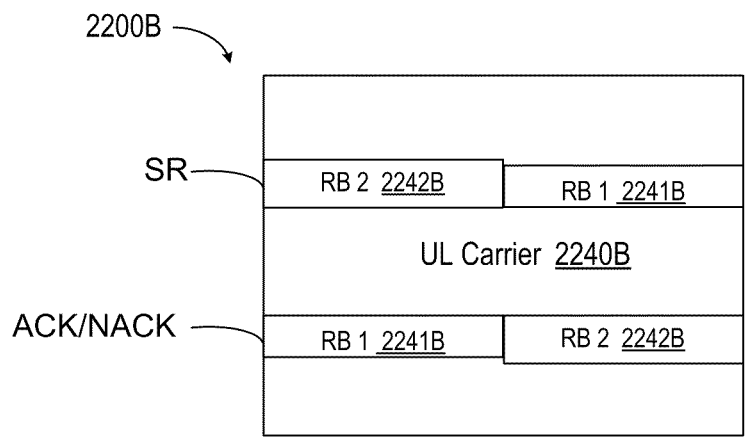
FIG. 22B is a diagram depicting an UL carrier that includes a plurality of orthogonal resources configured for simultaneous SR and ACK/NACK feedback.

In certain embodiments, an LTE-A UE can send SR and ACK/NACK simultaneously on a plurality of scheduled orthogonal resources. For example, FIG. 22B is a diagram 2200B depicting an UL carrier 2240B that includes a first resource (RB1) 2241B and a second resource (RB2) 2242B where RB1 2241B is configured for ACK/NACK feedback and RB2 2242B is configured for SR. SR and ACK/NACK are transmitted from an UE to an eNB over the configured RB1 2241B and RB2 2242B, respectively, in parallel. Alternatively, SORTD can be applied independently for SR and ACK/NACK when applicable over the configured resources (RB1 and RB2).

Figure 22C:
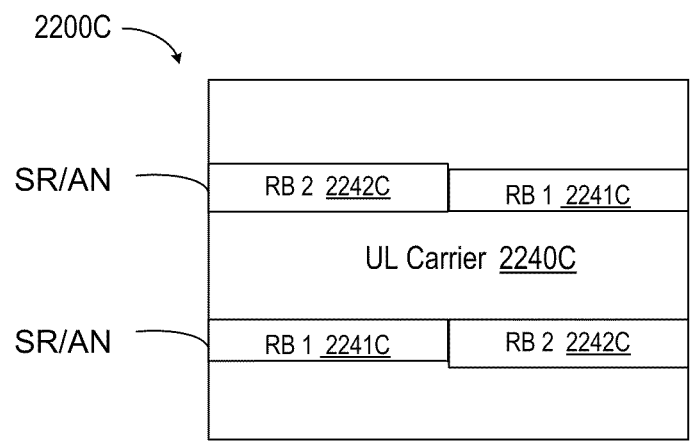
FIG. 22C is a diagram depicting an UL carrier that includes a plurality of orthogonal resources configured for SR where at least one of the plurality of orthogonal resources can be used for ACK/NACK feedback.

In some embodiments, an LTE-A UE can send ACK/NACK over resources configured for SR. SORTD is applied when multiple SR resources are configured. For example, FIG. 22C is a diagram 2200C depicting an UL carrier 2240C that includes a first resource (RB1) 2241C and a second resource (RB2) 2242C. RB1 2241C and RB2 2242C are both configured for SR, then ACK/NACK feedback can be sent over both of the configured resources with SORTD.

C. Channel Quality Indicator (CQI) Feedback

Figure 23A:
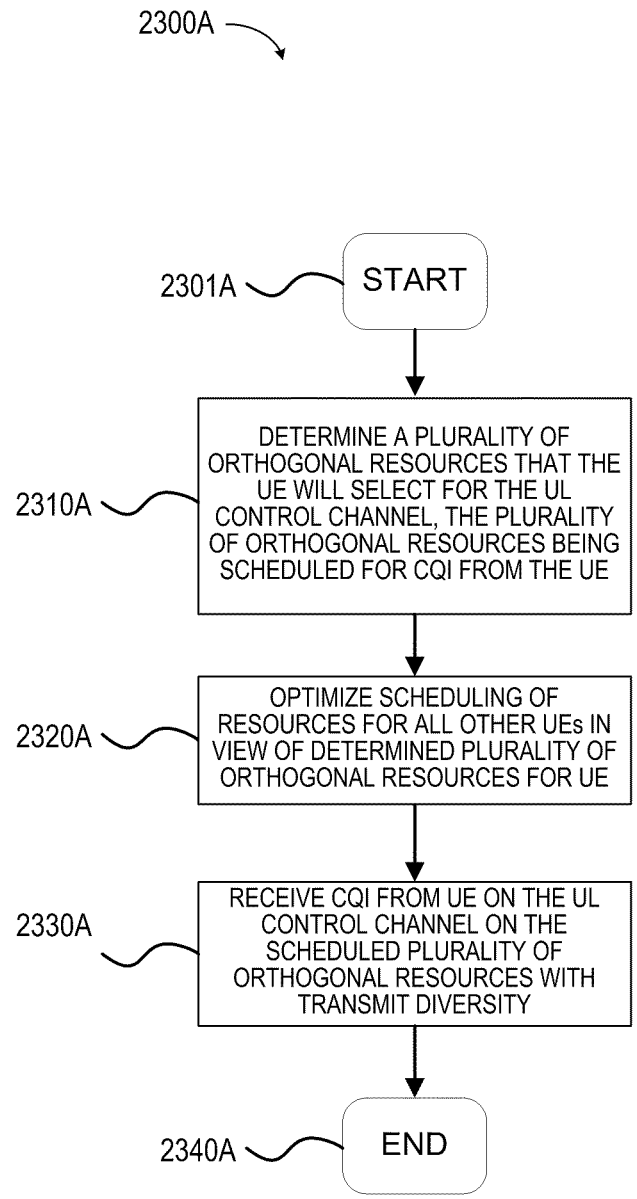
FIG. 23A is a flowchart illustrating an exemplary process for SORTD CQI feedback from a perspective of an eNB.

SORTD UL control channel resource allocation schemes for channel quality indicator (CQI) feedback from the UE are now described. In certain embodiments, an LTE-A UE is configured to send CQIs over a plurality of scheduled orthogonal resources. FIG. 23A is a flowchart illustrating an exemplary process 2300A for SORTD CQI from a perspective of an eNB. For ease of illustration without any intent to limit the scope of the present disclosure in any way, the process 2300A will be described with reference to FIG. 1. The process 2300A begins at start state 2301A and proceeds to operation 2310A in which the eNB 102 and/or the eNB scheduler 104 determine a plurality of orthogonal resources that the UE will select for CQI on the UL control channel. The process 2300A proceeds to operation 2320A in which the eNB 102 and/or the eNB scheduler 104 optimizes the scheduling of resources for use by all other UEs being serviced by eNB 102, taking into account the determined plurality of orthogonal resources that the UE 110 will select for use by the UE 110 for CQI on the UL control channel. The process 2300A proceeds to operation 2330A in which the eNB 102 receives CQI from UE 110 on the UL control channel on the scheduled plurality of orthogonal resources with transmit diversity. The process 2300A terminates at end state 2340A.

Figure 23B:
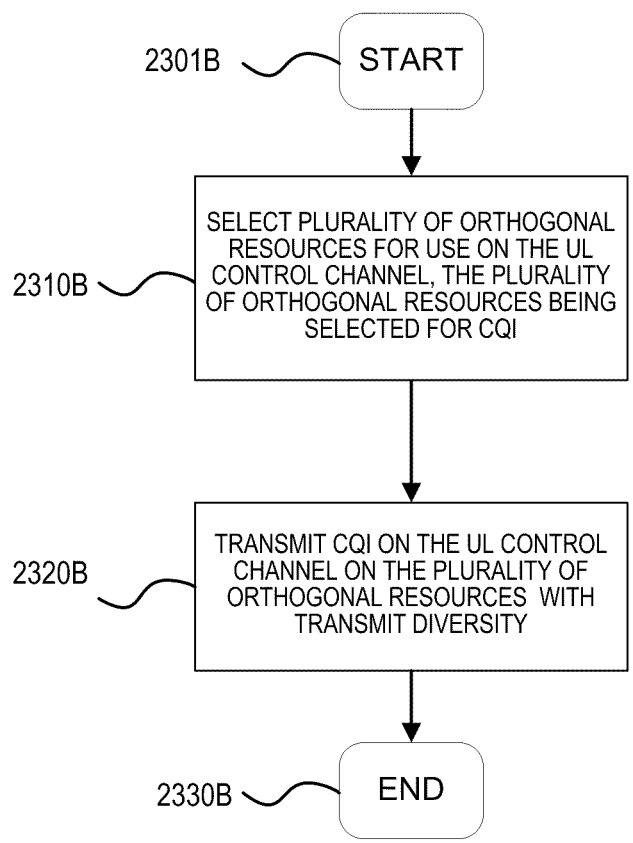
FIG. 23B is a flowchart illustrating an exemplary process for SORTD CQI feedback from a perspective of a UE.

FIG. 23B is a flowchart illustrating an exemplary process 2300B for SORTD CQI from a perspective of a UE. The process 2300B begins at start state 2301B and proceeds to operation 2310B in which the UE 110 selects a plurality of orthogonal resources for use by the UE 110 on the UL control channel for CQI. The process 2300B proceeds to operation 2320B in which the UE 110 transmits CQI on the UL control channel on the selected plurality of orthogonal resources with transmit diversity. The process 2300B terminates at end state 2330B.

Accordingly, the described embodiments herein provide for transmit diversity from the UE when sending various types of control information to the eNB on the UL control channel.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for resource allocation for an uplink control channel for a user equipment (UE) using multiple transmit antennas in a wireless communication network, comprising:
   determining a plurality of uplink control channel resources for the UE; and
   receiving control information from the UE on the plurality of uplink control channel resources, each uplink control channel resource of the plurality of uplink control channel resources being mapped to a different transmit antenna of the UE;
   wherein a first uplink control channel resource of the plurality of uplink control channel resources is determined based at least in part on a control channel element (CCE) of a downlink control channel, and wherein a second uplink control channel resource of the plurality of uplink control channel resources is determined based at least in part on the CCE and an offset.

2. The method of claim 1, wherein the plurality of uplink control channel resources are determined based at least in part on semi-persistent scheduling (SPS), and wherein the control information comprises acknowledgement/non-acknowledgment (ACK/NACK) feedback from the UE.

3. The method of claim 2, further comprising transmitting a transmit power correction command to the UE, the transmit power correction command including an indication that the plurality of uplink control channel resources are based at least in part on semi-persistent scheduling (SPS).

4. The method of claim 1, wherein the plurality of uplink control channel resources are used by the UE for transmitting one or more of a scheduling request (SR), acknowledgement/non-acknowledgment (ACK/NACK) feedback, a channel quality indicator (CQI), or a combination thereof.

5. The method of claim 1, wherein the wireless communication network is configured for downlink (DL) data transmission over a plurality of DL carriers.

6. The method of claim 5, wherein the control information comprises one or more of a scheduling request (SR), acknowledgement/non-acknowledgment (ACK/NACK) feedback related to the DL data transmission, a channel quality indicator (CQI), or a combination thereof.

7. The method of claim 5, wherein the control information is received over a plurality of uplink (UL) carriers, each UL carrier in the plurality of UL carriers corresponding to a respective one of the plurality of DL carriers.

8. The method of claim 7, wherein the determining the plurality of uplink control channel resources comprises selecting at least two uplink control channel resources from a plurality of available uplink control channel resources based on an uplink (UL) path loss associated with each of the plurality of available uplink control channel resources.

9. The method of claim 5, wherein the control information is received over a single UL carrier, the single UL carrier carrying acknowledgement/non-acknowledgement (ACK/NACK) messages associated with the DL data transmission over the plurality of DL carriers.

10. The method of claim 9, wherein the determining the plurality of uplink control channel resources comprises selecting at least two uplink control channel resources from a plurality of available uplink control channel resources, and wherein the at least two uplink control channel resources are closest to an edge of a bandwidth of the single UL carrier in comparison to the remainder of the plurality of available uplink control channel resources.

11. The method of claim 1, wherein the wireless communication network is configured for downlink (DL) data transmission over a plurality of DL subframes, and wherein the determining the plurality of uplink control channel resources includes determining a set of uplink control channel resources that will be used by the UE on the uplink control channel from a plurality of available uplink control channel resources.

12. The method of claim 11, wherein the control information comprises acknowledgment/non-acknowledgement (ACK/NACK) feedback of the DL data transmission.

13. The method of claim 11, wherein the control information is received over a single uplink (UL) subframe, the single UL subframe carrying acknowledgement/non-acknowledgement (ACK/NACK) feedback associated with the DL data transmission over the plurality of DL subframes.

14. The method of claim 13, wherein the determining the set of uplink control channel resources comprises selecting at least two uplink control channel resources from the plurality of available uplink control channel resources, and wherein the at least two uplink control channel resources are closest to an edge of a bandwidth of the single UL subframe in comparison to the remainder of the plurality of available uplink control channel resources.

15. A method for resource allocation for an uplink control channel for a user equipment (UE) using multiple transmit antennas in a wireless communication network, comprising:
determining a plurality of uplink control channel resources for the UE; and
transmitting control information via the plurality of uplink control channel resources, each of the plurality of uplink control channel resources being mapped to a different transmit antenna of the UE;
wherein a first uplink control channel resource of the plurality of uplink control channel resources is determined based at least in part on a control channel element (CCE) of a downlink control channel, and
wherein a second uplink control channel resource of the plurality of uplink control channel resources is determined based at least in part on the CCE and an offset.

16. The method of claim 15, wherein the plurality of uplink control channel resources are determined based at least in part on semi-persistent scheduling (SPS), and wherein the control information includes acknowledgement/non-acknowledgment (ACK/NACK) feedback from the UE.

17. The method of claim 15, wherein the control information includes a scheduling request (SR) from the UE.

18. The method of claim 17, wherein the control information includes simultaneous acknowledgement/non-acknowledgment (ACK/NACK) feedback and SR feedback from the UE.

19. The method of claim 18, wherein the control information includes the SR feedback transmitted on a first uplink control channel resource of the plurality of uplink control channel resources and further includes the acknowledgement/non-acknowledgment (ACK/NACK) feedback transmitted on a second uplink control channel resource of the plurality of uplink control channel resources.

20. The method of claim 18, wherein the control information includes the acknowledgement/non-acknowledgment (ACK/NACK) feedback transmitted on the plurality of uplink control channel resources allocated to SR feedback.

21. The method of claim 15, wherein the control information includes a channel quality indicator (CQI) from the UE.

22. The method of claim 15, wherein the control information comprises acknowledgment/non-acknowledgement (ACK/NACK) feedback associated with a downlink transmission over a single DL carrier.

23. The method of claim 15, wherein the CCE has an index of n_cce, and the offset is a nonzero integer.

24. The method of claim 15, wherein the wireless communication network is configured for downlink (DL) data reception over a plurality of DL carriers, and wherein the determining the plurality of uplink control channel resources includes determining a set of uplink control channel resources from a plurality of available uplink control channel resources.

25. The method of claim 24, wherein the control information is transmitted over a plurality of uplink (UL) carriers, each UL carrier in the plurality of UL carriers corresponding to a respective one of the plurality of DL carriers.

26. The method of claim 25, wherein the determined set of uplink control channel resources comprises at least two uplink control channel resources that are determined from the plurality of available uplink control channel resources based on an uplink (UL) path loss associated with each of the plurality of available uplink control channel resources.

27. The method of claim 26, wherein the control information is transmitted over a single UL carrier, the single UL carrier carrying acknowledgement/non-acknowledgement (ACK/NACK) messages associated with the DL data reception over the plurality of DL carriers.

28. The method of claim 26, wherein the determined set of uplink control channel resources comprises at least two uplink control channel resources that are determined among the plurality of available uplink control channel resources based on a proximity of each of the plurality of available uplink control channel resources to an edge of a bandwidth of the single UL carrier.

29. The method of claim 15, wherein the wireless communication network is configured for downlink (DL) data reception over a plurality of DL subframes, and wherein the determining the plurality of uplink control channel resources includes determining a set of uplink control channel resources from a plurality of available uplink control channel resources.

30. The method of claim 29, wherein the control information is transmitted over a single UL subframe, the single UL subframe carrying acknowledgement/non-acknowledgement (ACK/NACK) feedback associated with the DL data reception over the plurality of DL subframes.

31. The method of claim 30, wherein the set of uplink control channel resources comprises at least two uplink control channel resources that are determined from the plurality of available uplink control channel resources based on a proximity of each of the plurality of available uplink control channel resources to an edge of a bandwidth of the single UL subframe.

32. The method of claim 29, wherein the DL data transmission occurs in a time division duplex (TDD) mode.

33. A wireless communication apparatus for use in a wireless communication network, the apparatus supporting resource allocation for an uplink control channel for a user equipment (UE) using multiple transmit antennas, the apparatus comprising:
means for determining a plurality of uplink control channel resources for the UE; and
means for receiving control information from the UE on the plurality of uplink control channel resources, each uplink control channel resource of the plurality of uplink control channel resources being mapped to a different transmit antenna of the UE;
wherein a first uplink control channel resource of the plurality of uplink control channel resources is determined based at least in part on a control channel element (CCE) of a downlink control channel, and
wherein a second uplink control channel resource of the plurality of uplink control channel resources is determined based at least in part on the CCE and an offset.

34. The apparatus of claim 33, wherein the wireless communication network is configured for downlink (DL) data transmission over a plurality of DL carriers, and wherein the control information comprises one or more of a scheduling request (SR), acknowledgement/non-acknowledgment (ACK/NACK) feedback, a channel quality indicator (CQI), or a combination thereof.

35. The apparatus of claim 33, wherein the wireless communication network is configured for downlink (DL) data transmission over a plurality of DL subframes, and wherein the control information comprises acknowledgement/non-acknowledgement (ACK/NACK) feedback of the DL data transmission.

36. A computer program product comprising a non-transitory computer-readable storage medium including instructions that cause a computer to:
determine a plurality of uplink control channel resources for a user equipment (UE) with multiple transmit antennas; and
receive control information from the UE on the plurality of uplink control channel resources, each uplink control channel resource of the plurality of uplink control channel resources being mapped to a different transmit antenna of the UE;
wherein a first uplink control channel resource of the plurality of uplink control channel resources is determined based at least in part on a control channel element (CCE) of a downlink control channel, and
wherein a second uplink control channel resource of the plurality of uplink control channel resources is determined based at least in part on the CCE and an offset.

37. A wireless communication apparatus for use in a wireless communication network, the apparatus supporting resource allocation for an uplink control channel for a user equipment (UE) using multiple transmit antennas, the apparatus comprising:
a processor configured for:
determining a plurality of uplink control channel resources for the UE; and
receiving control information from the UE on the plurality of uplink control channel resources, each uplink control channel resource of the plurality of uplink control channel resources being mapped to a different transmit antenna of the UE;
wherein a first uplink control channel resource of the plurality of uplink control channel resources is determined based at least in part on a control channel element (CCE) of a downlink control channel, and
wherein a second uplink control channel resource of the plurality of uplink control channel resources is determined based at least in part on the CCE and an offset.

38. A wireless communication apparatus for use in a wireless communication network, the apparatus supporting resource allocation for an uplink control channel using multiple transmit antennas, the apparatus comprising:
means for determining a plurality of uplink control channel resources for a user equipment (UE); and
means for transmitting control information via the plurality of uplink control channel resources, each of the plurality of uplink control channel resources being mapped to a different transmit antenna of the UE;
wherein a first uplink control channel resource of the plurality of uplink control channel resources is determined based at least in part on a control channel element (CCE) of a downlink control channel, and
wherein a second uplink control channel resource of the plurality of uplink control channel resources is determined based at least in part on the CCE and an offset.

39. The apparatus of claim 38, wherein the plurality of uplink control channel resources are determined based at least in part on semi-persistent scheduling (SPS), and the control information includes acknowledgement/non-acknowledgment (ACK/NACK) feedback.

40. The apparatus of claim 38, wherein the control information includes an scheduling request (SR) feedback transmitted on a first uplink control channel resource of the plurality of uplink control channel resources and further includes an acknowledgement/non-acknowledgment (ACK/NACK) feedback transmitted on a second uplink control channel resource of the plurality of uplink control channel resources.

41. The apparatus of claim 38, wherein the wireless communication network is configured for downlink (DL) data reception over a plurality of DL carriers, wherein the means for determining the plurality of uplink control channel resources includes means for determining a set of uplink control channel resources from a plurality of available uplink control channel resources based on an uplink (UL) path loss associated with each of the plurality of available uplink control channel resources, and wherein the means for transmitting the control information includes means for transmitting the control information over a plurality of uplink (UL) carriers, each UL carrier in the plurality of UL carriers corresponding to a respective one of the plurality of DL carriers.

42. The apparatus of claim 38, wherein the wireless communication network is configured for downlink (DL) data reception over a plurality of DL carriers, wherein the means for determining the plurality of uplink control channel resources includes means for determining a set of uplink control channel resources from a plurality of available uplink control channel resources based on a proximity of each of the plurality of available uplink control channel resources to an edge of a bandwidth of a single UL carrier, and wherein the means for transmitting the control information includes means for transmitting the control information over the single UL carrier.

43. The apparatus of claim 38, wherein the wireless communication network is configured for downlink (DL) data reception over a plurality of DL subframes, and wherein the means for determining the plurality of uplink control channel resources includes means for determining a set of uplink control channel resources from a plurality of available uplink control channel resources.

44. The apparatus of claim 43, wherein the means for transmitting the control information includes means for transmitting the control information over a single UL subframe, the control information including acknowledgement/non-acknowledgement (ACK/NACK) feedback associated with the DL data reception over the plurality of DL subframes.

45. The apparatus of claim 44, wherein the means for determining the plurality of uplink control channel resources includes means for determining the set of uplink control channel resources from a plurality of available uplink control channel resources based on a proximity of each of the plurality of available uplink control channel resources to an edge of a bandwidth of the single UL subframe.

46. A computer program product comprising a non-transitory computer-readable storage medium including instructions that cause a computer to:
determine a plurality of uplink control channel resources for a user equipment (UE) with multiple transmit antennas; and
transmitting control information via the plurality of uplink control channel resources, each of the plurality of uplink control channel resources being mapped to a different transmit antenna of the UE;
wherein a first uplink control channel resource of the plurality of uplink control channel resources is determined based at least in part on a control channel element (CCE) of a downlink control channel, and
wherein a second uplink control channel resource of the plurality of uplink control channel resources is determined based at least in part on the CCE and an offset.

47. A wireless communication apparatus for use in a wireless communication network, the apparatus supporting resource allocation for an uplink control channel using multiple transmit antennas, the apparatus comprising:
a processor configured for:
determining a plurality of uplink control channel resources for a user equipment (UE); and
transmitting control information via the plurality of uplink control channel resources, each of the plurality of uplink control channel resources being mapped to a different transmit antenna of the UE;
wherein a first uplink control channel resource of the plurality of uplink control channel resources is determined based at least in part on a control channel element (CCE) of a downlink control channel, and
wherein a second uplink control channel resource of the plurality of uplink control channel resources is determined based at least in part on the CCE and an offset.

* * * * *